(12) United States Patent
Tanizawa et al.

(10) Patent No.: US 11,704,570 B2
(45) Date of Patent: Jul. 18, 2023

(54) LEARNING DEVICE, LEARNING SYSTEM, AND LEARNING METHOD

(71) Applicant: KABUSHIKI KAISHA TOSHIBA, Minato-ku (JP)

(72) Inventors: Akiyuki Tanizawa, Kawasaki (JP); Wataru Asano, Yokohama (JP); Atsushi Yaguchi, Taito (JP); Shuhei Nitta, Ota (JP); Yukinobu Sakata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 604 days.

(21) Appl. No.: 16/801,210

(22) Filed: Feb. 26, 2020

(65) Prior Publication Data
US 2021/0073641 A1 Mar. 11, 2021

(30) Foreign Application Priority Data
Sep. 5, 2019 (JP) .................. 2019-161791

(51) Int. Cl.
*G06N 3/082* (2023.01)
*G06N 3/063* (2023.01)
*G06N 3/048* (2023.01)

(52) U.S. Cl.
CPC ............. *G06N 3/082* (2013.01); *G06N 3/048* (2023.01); *G06N 3/063* (2013.01)

(58) Field of Classification Search
CPC .... G06N 3/0454; G06N 3/0481; G06N 3/063; G06N 3/082; G06N 3/086; G06N 5/003; G06N 7/005
See application file for complete search history.

(56) References Cited

U.S. PATENT DOCUMENTS

| 5,636,326 A | * | 6/1997 | Stork | .................. | G01N 33/005 706/25 |
| 10,902,293 B2 | * | 1/2021 | Kamath | ............... | G06F 18/214 |

(Continued)

FOREIGN PATENT DOCUMENTS

| JP | 2015-11510 A | 1/2015 |
| JP | 2018-129033 A | 8/2018 |

(Continued)

OTHER PUBLICATIONS

Lai, Yi-An, et al. "Prune: Preserving proximity and global ranking for network embedding." Advances in neural information processing systems 30 (2017): 1-10 (Year: 2017).*

(Continued)

*Primary Examiner* — Kamran Afshar
*Assistant Examiner* — Randall K. Baldwin
(74) *Attorney, Agent, or Firm* — Oblon, McClelland, Maier & Neustadt, L.L.P.

(57) ABSTRACT

A learning device includes a structure search unit that searches for a first learned model structure obtained by selecting search space information in accordance with a target constraint condition of target hardware for each of a plurality of convolution processing blocks included in a base model structure in a neural network model; a parameter search unit that searches for a learning parameter of the neural network model in accordance with the target constraint condition; and a pruning unit that deletes a unit of at least one of the plurality of convolution processing blocks in the first learned model structure based on the target constraint condition and generates a second learned model structure.

9 Claims, 20 Drawing Sheets

(56) References Cited

U.S. PATENT DOCUMENTS

| | | | |
|---|---|---|---|
| 2015/0006444 | A1 | 1/2015 | Tamatsu et al. |
| 2017/0261949 | A1* | 9/2017 | Hoffmann .......... G05B 13/0265 |
| 2018/0137435 | A1* | 5/2018 | Okamoto ............... G06N 20/00 |
| 2018/0181867 | A1* | 6/2018 | Seibold ................ G06K 9/6253 |
| 2018/0307969 | A1* | 10/2018 | Shibahara ................ G06N 3/08 |
| 2019/0057309 | A1* | 2/2019 | Oobuchi ................ G06N 3/063 |
| 2019/0258931 | A1 | 8/2019 | Garcia et al. |
| 2020/0143227 | A1* | 5/2020 | Tan ......................... G06N 3/084 |
| 2020/0272859 | A1* | 8/2020 | Iashyn .................... H04L 67/10 |
| 2021/0027166 | A1* | 1/2021 | Gorokhov ............ G06N 3/0481 |
| 2021/0056378 | A1* | 2/2021 | Yang .................. G06F 16/9024 |
| 2021/0117948 | A1* | 4/2021 | Voss ......................... G06N 3/08 |

FOREIGN PATENT DOCUMENTS

| | | |
|---|---|---|
| JP | 2018-181187 A | 11/2018 |
| WO | WO 2017/187798 A1 | 11/2017 |

OTHER PUBLICATIONS

Lin, Ji, et al. "Runtime neural pruning." Advances in neural information processing systems 30 (2017):1-11 (Year: 2017).*

Yaguchi, Atsushi, et al. "Adam induces implicit weight sparsity in rectifier neural networks." 2018 17th IEEE International Conference on Machine Learning and Applications (ICMLA). IEEE, 2018: 318-325 (Year: 2018).*

Bansal, Yamini, et al. "Minnorm training: an algorithm for training over-parameterized deep neural networks." arXiv preprint arXiv:1806.00730v2 (2018): 1-18 (Year: 2018).*

Chin, Ting-Wu, Cha Zhang, and Diana Marculescu. "Layer-compensated pruning for resource-constrained convolutional neural networks." arXiv preprint arXiv:1810.00518 (2018). (Year: 2018).*

Gordon, Ariel, et al. "Morphnet: Fast & simple resource-constrained structure learning of deep networks." Proceedings of the IEEE conference on computer vision and pattern recognition. 2018: 1586-1595 (Year: 2018).*

Dong, Jin-Dong, et al. "Ppp-net: Platform-aware progressive search for pareto-optimal neural architectures." (2018): 1-4 (Year: 2018).*

MMehta, Dushyant, Kwang In Kim, and Christian Theobalt. "On Implicit Filter Level Sparsity in Convolutional Neural Networks." arXiv preprint arXiv:1811.12495v2. (Apr. 5, 2019): 1-14 (Year: 2019).*

Tan, Mingxing, et al. "MnasNet: Platform-Aware Neural Architecture Search for Mobile." 2019 IEEE/CVF Conference on Computer Vision and Pattern Recognition (CVPR). IEEE, Jun. 2019: 2815-2823 (Year: 2019).*

Zhang, Xinyi, et al. "When neural architecture search meets hardware implementation: from hardware awareness to co-design." 2019 IEEE Computer Society Annual Symposium on VLSI (ISVLSI). IEEE, Jul. 2019: 25-30 (Year: 2019).*

Cai, Han, Ligeng Zhu, and Song Han. "Proxylessnas: Direct neural architecture search on target task and hardware." arXiv preprint arXiv:1812.00332v2 (Feb. 2019): 1-13 (Year: 2019).*

Yang, Chen, et al. "Structured pruning of convolutional neural networks via l1 regularization." IEEE Access 7 (Aug. 2019): 106385-106394. (Year: 2019).*

Yaguchi, A. et al., "Adam Induces Implicit Weight Sparsity in Rectifier Neural Networks," 2018 IEEE, https://arxiv.org/abs/1812.08119, arXiv:1812.08119v1 [cs.LG], Dec. 19, 2018, 8 pages.

Howard, A. G. et al., "MobileNets: Efficient Convolutional Neural Networks for Mobile Vision Applications," https://arxiv.org/abs/1704.04861, arxiv:1704.04861va1 [cs.CV], Apr. 17, 2017, 9 pages.

Zoph, B. et al., Neural Architecture Search With Reinforcement Learning, ICLR 2017, https://arxiv.prg/abs/1611.01578, arXiv:1611.01578v2 [cs.LG], Feb. 15, 2017, pp. 1-16.

Liu, W. et al., "SSD: Single Shot MultiBox Detector," https://arxiv.org/abs/1512.023525, arXiv:1512.02325v5 [cs.CV], Dec. 29, 2016, pp. 1-17.

* cited by examiner

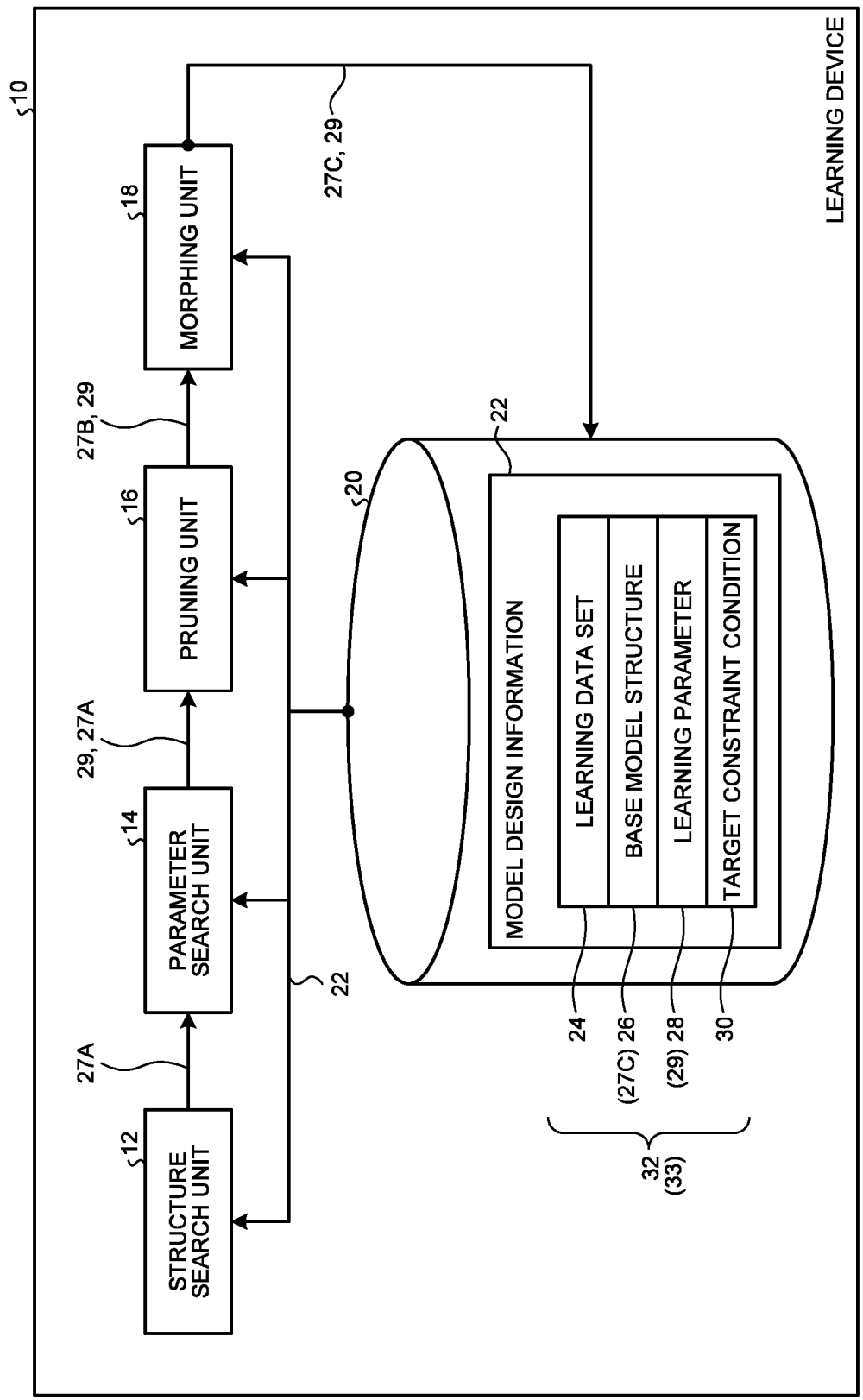

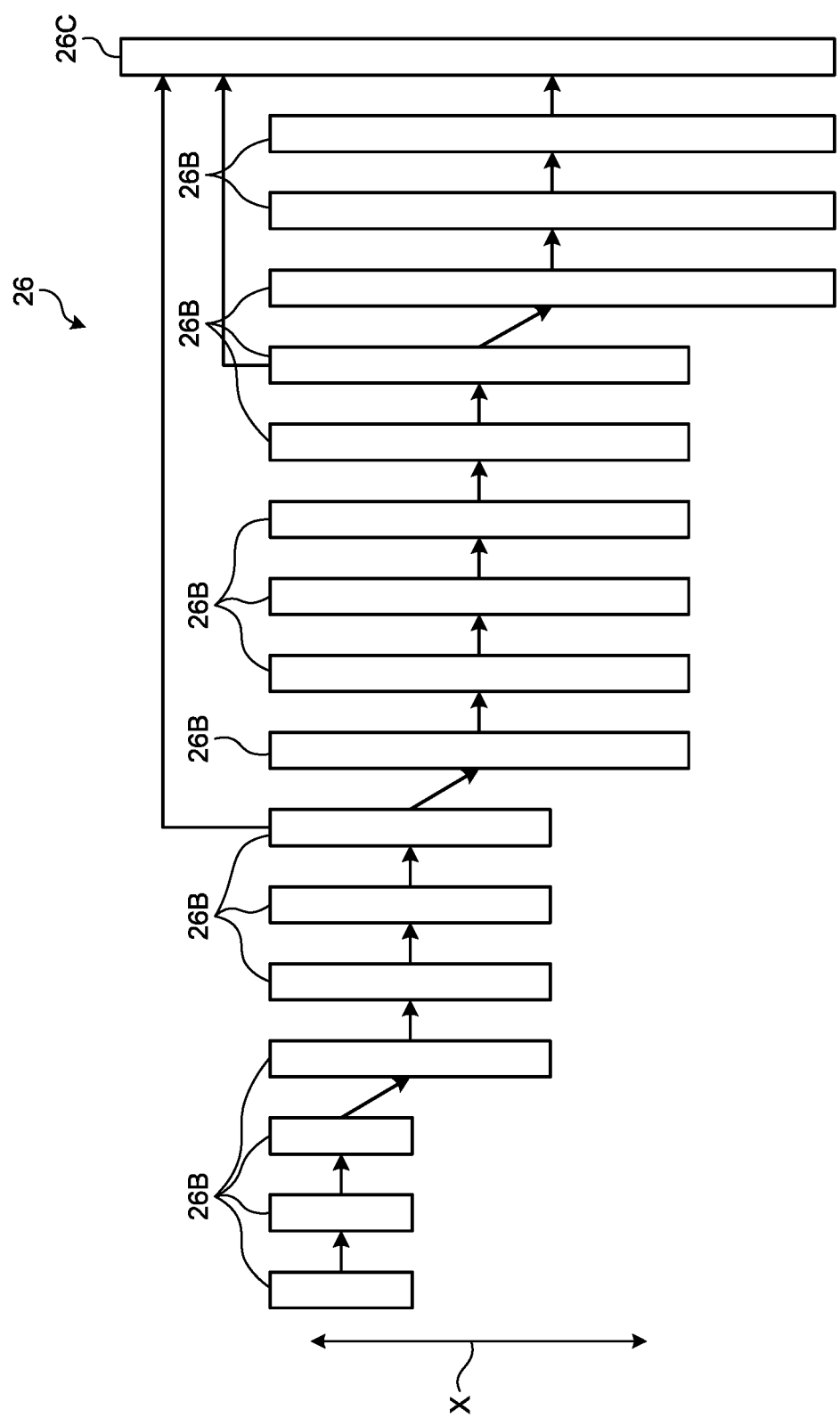

FIG.4

| ITEM | TARGET VALUE | REMARKS |
|---|---|---|
| HARDWARE ID | 01 | ID TO IDENTIFY HARDWARE |
| MODEL SIZE | 500 KB | NUMBER OF PARAMETERS PROVIDED IN MODEL OF NEURAL NETWORK |
| MODEL CALCULATION AMOUNT | 500 TFLOPS | CALCULATION AMOUNT WHEN INFERRING MODEL |
| POWER CONSUMPTION | 20 W | POWER CONSUMPTION SIMULATED ON TARGET HARDWARE |
| INFERENCE SPEED | 10 msec | INFERENCE SPEED SIMULATED ON TARGET HARDWARE |
| MERMORY AMOUNT | 800 KB | MEMORY USAGE SIMULATED ON TARGET HARDWARE |
| MEMORY BANDWIDTH | 1 Gbps | MEMORY BANDWIDTH SIMULATED ON TARGET HARDWARE |
| ... | ... | ... |

| HYPERPARAMETER | SEARCH RANGE | REMARKS |
|---|---|---|
| OPTIMIZATION TECHNIQUE | mSGD, Adam | |
| LEARNING RATE | 1e-4 TO 1e-2 | 1/10 IN CASE OF Adam |
| L2 REGULARIZATION STRENGTH (WEIGHT DECAY) | 1e-5 TO 1e-2 | PARAMETER CORRESPONDING TO STRENGTH OF GROUP SPARSIFYING |
| L1 REGULARIZATION STRENGTH | 1e-5 TO 1e-2 | APPLIED ONLY TO REGULARIZATION PROCESSING |
| ACTIVATION FUNCTION | ReLU, PReLU Leaky ReLU | |
| DROPOUT RATE | 0.0 TO 0.6 | FORCIBLY SET SOME UNITS TO ZERO |
| LAYER UNIT COUNT | 8 TO 512 | NUMBER OF UNITS POSSESSED BY LAYER |
| KERNEL SIZE OF UNIT | 3x3 TO 5x5 | SIZE OF CONVOLUTION FILTER IN CONVOLUTION LAYER |
| ... | ... | HYPERPARAMETER OTHER THAN ABOVE-DESCRIBED HYPERPARAMETERS CAN BE ARBITRARILY ADDED |

FIG.10

| HYPERPARAMETER | VALUE AFTER SEARCH | REMARKS |
|---|---|---|
| OPTIMIZATION TECHNIQUE | Adam | |
| LEARNING RATE | 4.94e-4 | |
| L2 REGULARIZATION STRENGTH (WEIGHT DECAY) | 1.12e-4 | PARAMETER CORRESPONDING TO STRENGTH OF GROUP SPARSIFYING |
| L1 REGULARIZATION STRENGTH | 5.84e-4 | APPLIED ONLY TO REGULARIZATION PROCESSING |
| ACTIVATION FUNCTION | ReLU | |
| DROPOUT RATE | 0.0 | FORCIBLY SET SOME UNITS TO ZERO |

LEARNING DEVICE, LEARNING SYSTEM, AND LEARNING METHOD

CROSS-REFERENCE TO RELATED APPLICATIONS

This application is based upon and claims the benefit of priority from Japanese Patent Application No. 2019-161791, filed on Sep. 5, 2019; the entire contents of which are incorporated herein by reference.

FIELD

Embodiments described herein relate generally to a learning device, a learning system, and a learning method.

BACKGROUND

Significant performance improvements are realized in technical fields, such as image recognition, speech recognition, and text processing, by utilizing neural network models. Many techniques using deep learning are used for neural network models. A network model obtained by deep learning is called a deep neural network (DNN) model, for which an amount of calculation is large because convolution processing is performed in each layer. In addition, a technique using deep learning requires a lot of weight coefficient data. Thus, when a conventional neural network model is operated on specific hardware, there is a case where memory usage and a transfer amount are large so that real-time processing becomes difficult with hardware having a relatively low calculational performance, such as mobiles and in-vehicle devices. To address such a problem, a method of obtaining a structure of a neural network model having a high generalization capability and a simple structure is disclosed.

However, in a conventional technique, a random unit is deleted from a learning model of an initial structure, then, relearning is performed, and a structure whose post-search cost is lower than initial cost is selected as an optimal model structure. However, by the conventional technique, optimization of a model in accordance with target hardware is difficult. In addition, in the conventional model downsizing methods such as the method of deleting a unit, a method of simplifying a convolution structure, and a method of searching for network connections, simplifying in accordance with target hardware are not performed. As described above, designing a preferable neural network model for the target hardware is difficult by the conventional techniques.

BRIEF DESCRIPTION OF THE DRAWINGS

FIG. 1 is a functional block diagram of a learning device according to an embodiment;

FIG. 3 is a schematic diagram illustrating a base model structure;

FIG. 4 is a diagram illustrating a target constraint condition;

FIG. 9 is an explanatory diagram of the search space information;

FIG. 10 is a schematic diagram of a searched learning parameter;

DETAILED DESCRIPTION

Figure 2A:
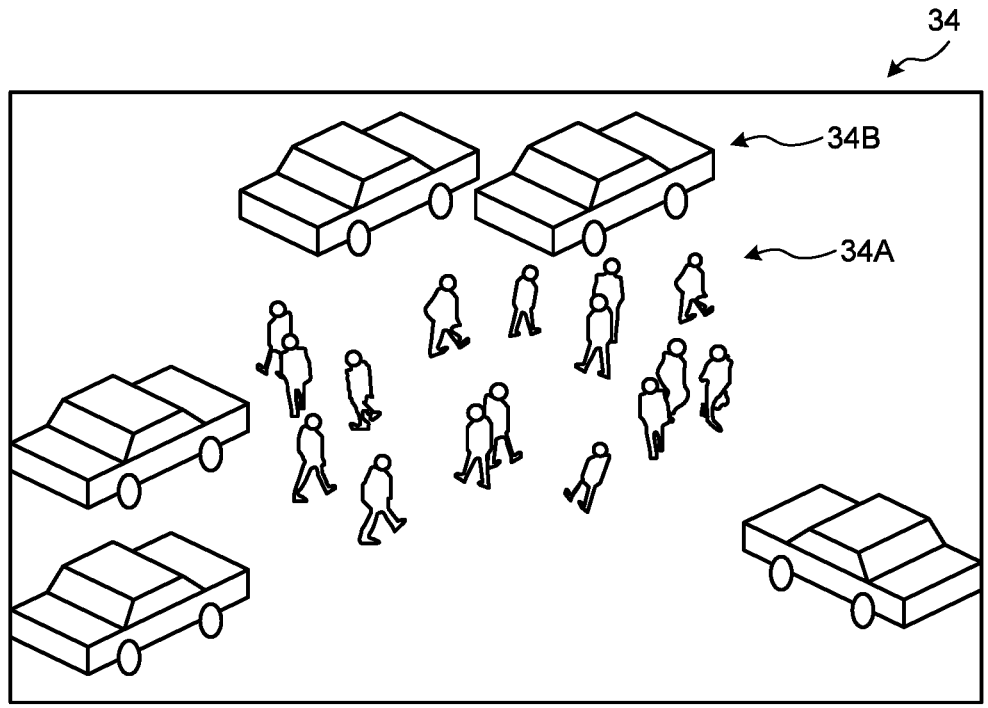
FIG. 2A is a diagram illustrating an input image.

According to an embodiment, a learning device includes one or more hardware processors configured to function as a structure search unit. The structure search unit searches for a first learned model structure. The first learned model structure is obtained by selecting search space information in accordance with a target constraint condition of target hardware for each of a plurality of convolution processing blocks included in a base model structure in a neural network model. With reference to the accompanying drawings, a learning device, a learning system, and a learning method according to embodiments will be described in detail.

FIG. 1 is a functional block diagram illustrating an example of a functional configuration of a learning device 10 of the present embodiment. The learning device 10 of the present embodiment uses a neural network model 32 and a target constraint condition 30 to design a neural network model 33 that is a deep learning model.

The learning device 10 includes a structure search unit 12, a parameter search unit 14, a pruning unit 16, a morphing unit 18, and a storage unit 20.

The structure search unit 12, the parameter search unit 14, the pruning unit 16, and the morphing unit 18 are implemented by, for example, one or a plurality of processors. For example, the above-described respective units may be implemented by causing a processor such as a central processing unit (CPU) to execute a program, that is, software. The above-described respective units may be implemented by a processor such as a dedicated IC, that is, hardware. The above-described respective units may be implemented using both the software and the hardware in combination. In the case of using the plurality of processors, each of the processors may implement one of the respective units, or may implement two or more of the respective units.

The storage unit 20 stores various types of data. In the present embodiment, the storage unit 20 stores various types of data such as model design information 22.

The model design information 22 is information used for learning of the neural network model 33. The neural network model 33 is a neural network model after being learned (designed) by the learning device 10. The neural network model 32 is a neural network model before being learned (designed) by the learning device 10.

The model design information 22 includes a learning data set 24, a base model structure 26, a learning parameter 28, and a target constraint condition 30. The base model structure 26 and the learning parameter 28 correspond to the neural network model 32 before being learned, that is, designed by the learning device 10. The base model structure 26 and the learning parameter 28 are updated by processing of the structure search unit 12, the parameter search unit 14, the pruning unit 16, and the morphing unit 18, which will be described later, whereby the neural network model 33 is designed (details will be described later).

The learning data set 24 is a group of teacher data of the neural network model 32.

The teacher data is a group of teacher data including a combination of data for learning, data for evaluation, and a correct answer label. For example, it is assumed that the neural network model 32 is a learning model for image identification. In this case, the learning data set 24 is a group of teacher data including a combination of an image used for learning, an image used for evaluation, and a correct answer label. Specifically, for example, it is assumed that the neural network model 32 is a learning model for handwritten numeric character recognition. In this case, the learning data set 24 is a group of teacher data including a combination of an image for learning including a handwritten numeral, an image for evaluation, and a correct answer label to which a correct answer for the numeral is attached in advance manually or the like. The data for evaluation is data configured to evaluate the learned neural network model 33.

Incidentally, the neural network model 32 is not limited to the learning model for image identification. For example, the neural network model 32 may be a learning model for other tasks such as a clustering task, a registration task, a segmentation task, a generation task, a regression task, and a reinforcement task. In addition, input data of the learning data set 24 may be data other than the image, such as audio data, time-series data, language/text data, or data such as point cloud data, voxel data, and a radar signal.

The neural network model 32 is a deep learning model that can be used universally for the above-described various tasks, such as the image identification and the clustering task, and various types of input data such as an image and data other than the image. In the present embodiment, a case where the neural network model 32 is a learning model configured for an object detection task to detect a target, such as an object, from an image will be described as an example.

Thus, a case where the learning data set 24 is a group of teacher data including a combination of an image for learning, which is input data, an image for evaluation, and a correct answer label for object detection, which is output data, will be described as an example in the present embodiment.

Figure 2B:
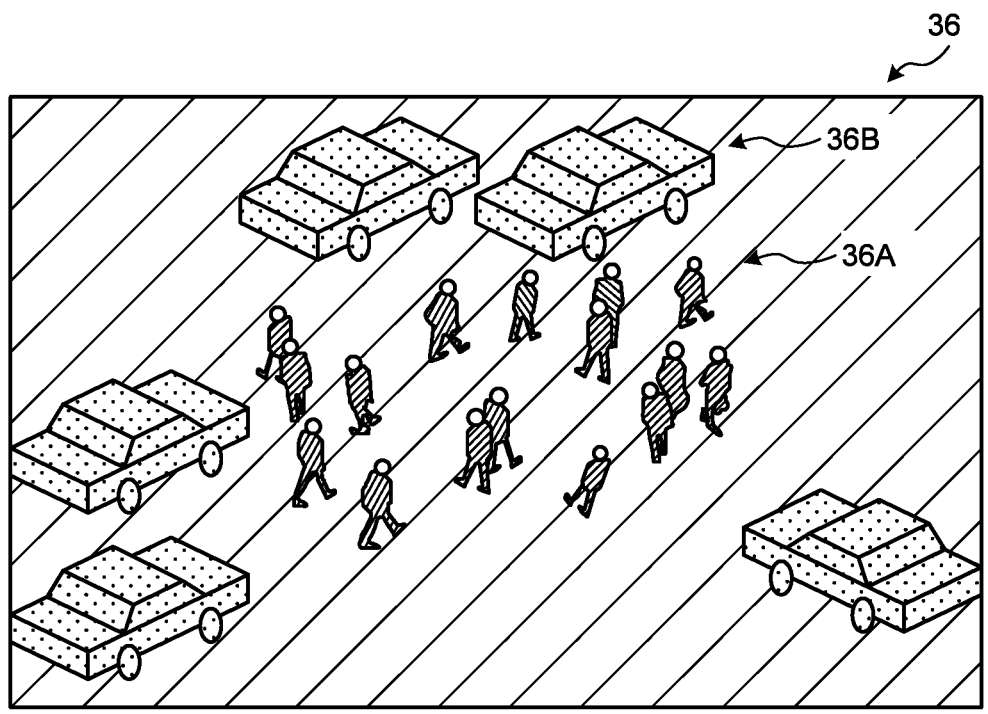
FIG. 2B is a diagram illustrating a correct answer label.

FIGS. 2A and 2B are diagrams illustrating examples of a combination of an input image 34 and a correct answer label 36 in the learning data set 24. FIG. 2A is a diagram illustrating an example of the input image 34 for each object such as a pedestrian 34A, a car 34B. FIG. 2B is a diagram illustrating an example of the correct answer label 36 for the input image 34 of FIG. 2A. For the correct answer label 36, for example, a different brightness value is given as the correct answer label 36 for each object such as a pedestrian 36A, a car 36B, and a bicycle. Incidentally, the learning data set 24 is not limited to the examples illustrated in FIGS. 2A and 2B.

Returning to FIG. 1, the description will be continued. Single shot detection (SSD) is known as an object detection technique (W. Liu, et. Al. "SSD: Single Shot MultiBox Detector," ArXiv preprint).

In the present embodiment, a description will be given regarding an example where ResNet-N is used as a feature extraction portion of a preceding stage of the SSD as the neural network model 32. The ResNet is a network structure used for various tasks recently, and is a deep learning model that improves an expression capability and performance of a learning model by deepening a neural network by combining a plurality of ResBlocks. In addition, the ResNet is a deep learning model that enables stable learning even if the network is deepened. The above-described N represents a depth of the ResNet. As the ResNet, for example, various structures such as ResNet-34 and ResNet-50 are known. In the present embodiment, a case where the structure of the neural network model 32 is equivalent to ResNet-34 will be described as an example.

The base model structure 26 is information indicating a structural portion (architecture) of the neural network model 32. The base model structure 26 has a plurality of convolution processing blocks.

FIG. 3 is a schematic diagram illustrating an example of the base model structure 26. FIG. 3 illustrates an example of the base model structure 26 of the neural network model 32 which is a ResNet structure.

The base model structure 26 includes a plurality of convolution processing blocks 26B. The convolution processing blocks 26B are, for example, a cluster of processing blocks such as ResBlock. FIG. 3 illustrates, as an example, sixteen convolution processing blocks 26B and an output layer 26C. However, the number of the convolution processing blocks 26B is not limited to sixteen.

In addition, FIG. 3 illustrates arrows indicating which of the other convolution processing blocks 26B or the output layer 26C each output of the plurality of convolution processing blocks 26B is connected to.

In FIG. 3, a width (length in an arrow X direction) of each of the convolution processing blocks 26B corresponds to the number of units in each of the convolution processing blocks 26B. The number of units is the number of calculation units in the convolution processing block 26B. A unit is sometimes referred to as a node when the convolution processing block 26B is a fully coupled layer or a convolution filter when the convolution processing block 26B is a convolution layer. Hereinafter, the number of units is sometimes simply referred to as a unit count.

In the base model structure 26, in general, the resolution of an image is reduced to half both vertically and horizontally by increasing a stride width, which is a unit for sampling a spatial width, at the timing when the unit count increases or using a pooling process which is one of spatial subsampling techniques. The longer the width of the convolution processing block 26B is, the larger the number of filters held in the convolution processing block 26B is.

Returning to FIG. 1, the description will be continued. In the present embodiment, the storage unit 20 stores the base model structure 26 of the neural network model 32 and the learning parameter 28 in advance. For example, the storage unit 20 stores the base model structure 26 and the learning parameter 28 of the large-scale neural network model 32, which is learned in advance using the learning data set 24 with another model design device or the like, in advance.

Next, the target constraint condition 30 will be described. The target constraint condition 30 is information indicating a constraint condition configured to operate the neural network model 32 with target hardware.

The target hardware is hardware on which the neural network model 33 learned by the learning device 10 is to be operated. In other words, the target hardware is hardware that executes various processes using the neural network model 33. The target hardware is a computer including a processor such as a CPU, a field-programmable gate array (FPGA), and an application specific integrated circuit (ASIC). For example, the target hardware is a processor mounted on a mobile terminal, an in-vehicle terminal, or the like. In addition, the target hardware may be a processor having a calculation performance equal to or lower than a predetermined performance.

In other words, the target constraint condition 30 is an index determined by specifications of the target hardware.

FIG. 4 is a diagram illustrating an example of the target constraint condition 30. The target constraint condition 30 is stored in association with a hardware ID that is identification information of the target hardware. FIG. 4 illustrates an example in which the target constraint condition 30 includes the hardware ID. The hardware ID is the identification information of the target hardware. The target constraint condition 30 includes, for example, at least one item of a model size, a model calculation amount, latency, power consumption, an inference speed, memory usage, a memory size of a neural network model, and a memory bandwidth, and a target value corresponding to each item.

The model size is a size of the neural network model 32. The target value of the model size is represented by the number of parameters provided in the neural network model 32, for example. The model calculation amount is a calculation amount of the neural network model 32. The target value of the model calculation amount is expressed by, for example, a calculation amount at the time of inferring the neural network model 32.

The power consumption represents power consumed at the time of inferring the neural network model 32. The inference speed represents an inference speed of the neural network model 32. The inference speed (latency) represents the inference speed of the neural network model 32. The memory usage represents a memory amount used by the neural network model 32. The memory bandwidth represents a memory bandwidth of the neural network model 32. The power consumption, the inference speed, the memory amount, and the memory width are preferably measured in advance by, for example, operating the neural network model 32 on target hardware identified by a corresponding hardware ID or by simulating an equivalent operation.

The target value of each item included in the target constraint condition 30 indicates an upper limit value of an evaluation index of the corresponding item.

For example, when the neural network model 32 is a learning model for a segmentation task, evaluation indices include various evaluation indices such as precision/recall and intersection over union (IoU).

Returning to FIG. 1, the description will be continued.

The structure search unit 12 searches for a first learned model structure 27A. The first learned model structure is obtained by selecting search space information in accordance with a target constraint condition 30 of target hardware for each of the plurality of convolution processing blocks 26B included in a base model structure 26. That is, the base model structure 26 included in the model design information 22 is updated to the first learned model structure 27A by the structure search unit 12.

The structure search unit 12 selects search space information in accordance with a target constraint condition of target hardware for each of the convolution processing blocks 26B from among the plurality of pieces search space information of different calculation methods.

Figure 5:
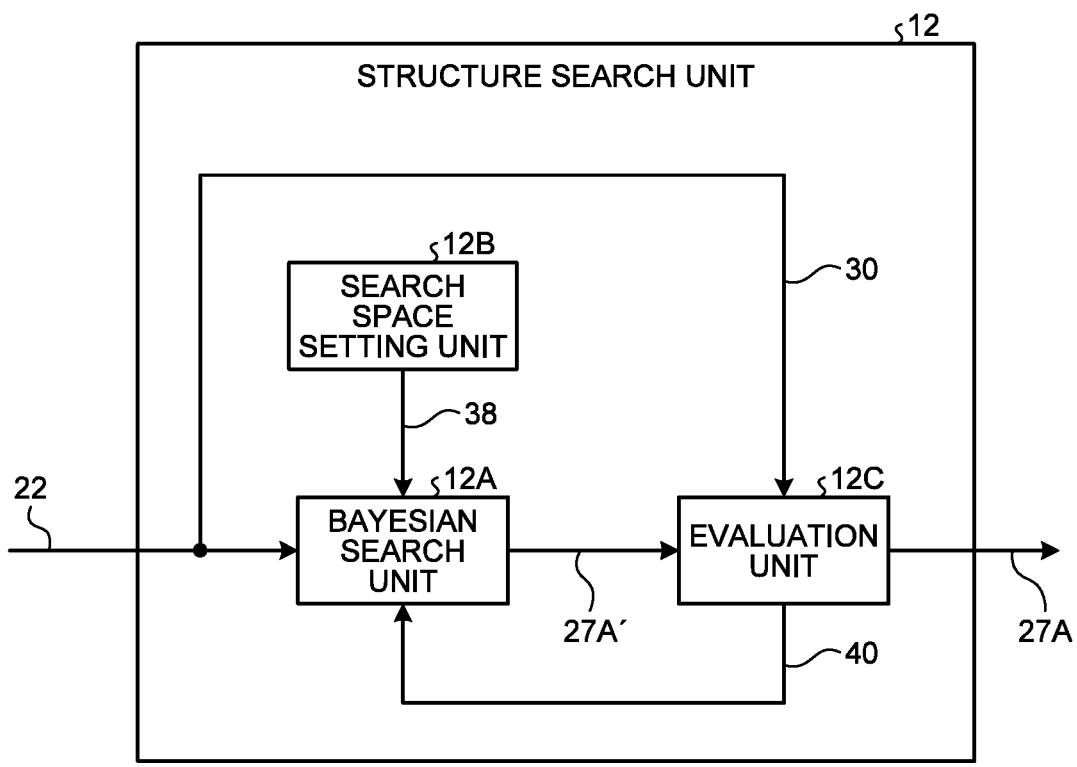
FIG. 5 is a functional block diagram of a structure search unit.

FIG. 5 is a functional block diagram illustrating an example of a functional configuration of the structure search unit 12. The structure search unit 12 includes a Bayesian search unit 12A, a search space setting unit 12B, and an evaluation unit 12C.

When the model design information 22 is input to the structure search unit 12, the search space setting unit 12B outputs the plurality of pieces of search space information 38 of different calculation methods to the Bayesian search unit 12A.

Figure 6:
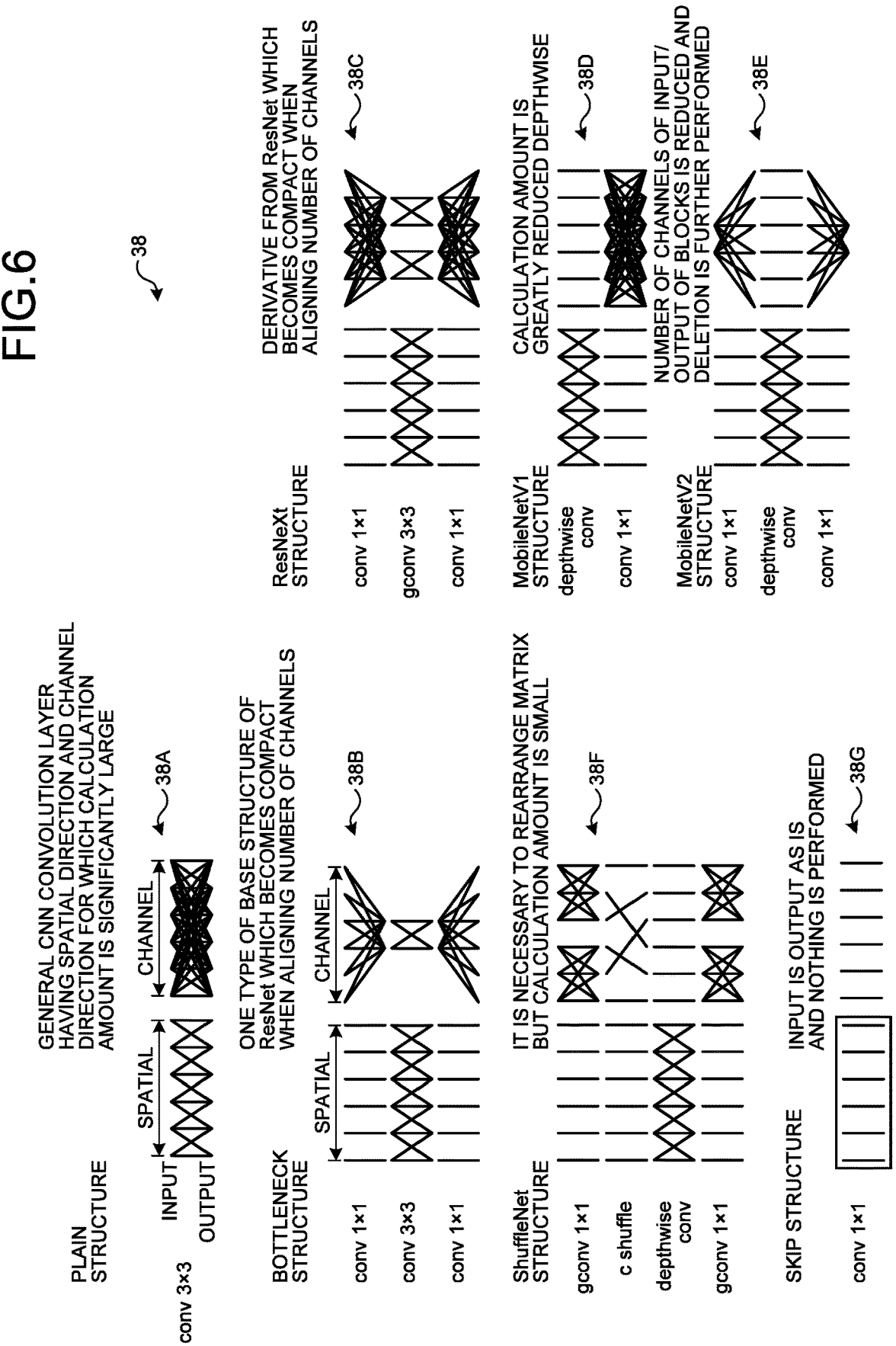
FIG. 6 is an explanatory diagram of search space information.

FIG. 6 is an explanatory diagram illustrating examples of the search space information 38. The search space information 38 is, for example, at least one of a Plain structure 38A, a Bottleneck structure 38B, a ResNeXt structure 38C, a MobileNetV1 structure 38D, a MobileNetV2 structure 38E, a ShuffleNet structure 38F, and a Skip structure 38G. These pieces of search space information 38 (the Plain structure 38A to the Skip structure 38G) have different calculation amounts. Incidentally, the structures generally used in convolution processing are illustrated herein, but the embodiments are not limited to these structures.

The Plain structure 38A is the most common convolution structure. The Bottleneck structure 38B to the Skip structure 38G are the search space information 38 having a smaller calculation amount of the convolution processing than the Plain structure 38A.

For example, the Plain structure 38A has a structure including a spatial direction and a channel direction, requiring an extremely large calculation amount of convolution processing. The Bottleneck structure 38B is a separation type convolution structure in which a spatial direction and a channel direction are separated, convolution processing in the channel direction is performed first, and then, convolution processing in the spatial direction is performed, and lastly, convolution processing in the channel direction is performed again. The ResNeXt structure 38C is a derivative from the Bottleneck structure 38B, and is a structure for which convolution processing is performed by dividing channels into groups. The MobileNetV1 structure 38D is a structure for which convolution processing is performed depthwise and pointwise. The MobileNetV2 structure 38E is a structure in which the Bottleneck structure 38B and the MobileNetV1 structure 38D are combined, and convolution processing in a spatial direction is set to depthwise. The ShuffleNet structure 38F is a structure in which nodes are divided into groups and subjected to convolution processing in a channel direction, and then, the groups are subjected to convolution processing in a mixed manner.

The Skip structure 38G is a structure for which convolution processing is not performed. That is, the Skip structure 38G is a structure that outputs input data as is. When the Skip structure 38G is selected as the search space information 38 of the convolution processing block 26B, the convolution processing block 26B is a processing block (layer) that is not subjected to convolution processing. FIG. 6 illustrates the diagram in which each channel is multiplied independently by a constant for the Skip structure 38G in order to clarify a difference from the other search space information 38 (the Plain structure 38A to the MobileNetV2 structure 38E). However, the Skip structure 38G has the structure that outputs the input data as is, as described above. Therefore, when the Skip structure 38G is selected as the search space information 38 of the convolution processing block 26B, the number of the convolution processing blocks 26B constituting the base model structure 26 can be reduced, and the calculation amount in the depthwise direction of the neural network model 32 can be reduced.

Returning to FIG. 5, the description will be continued. The Bayesian search unit 12A searches for the search space information 38 selected for each of the plurality of convolution processing blocks 26B constituting the base model structure 26 included in the model design information 22 according to the plurality of pieces of search space information 38 input from the search space setting unit 12B. The Bayesian search unit 12A searches for the search space information 38 suitable under the target constraint condition 30 in each of the plurality of convolution processing blocks 26B.

The Bayesian search unit 12A may search the search space information 38 using a known method such as random search, grid search, and Bayesian search.

The grid search is a search method of executing parameters of a given search space in an experimental design and selecting a parameter having the highest evaluation index.

The Bayesian search is a search method of estimating and searching for a parameter candidate such that an evaluation index becomes the highest based on the relationship between the attempted parameter and the evaluation index. In general, a technique using a Gaussian process is used as a technique for predicting a good quality solution stochastically from an observation point. In the Gaussian process, an average value and a variance in a search space are determined from the observation points so far, and those having a good evaluation function value are selected and searched in the process in which the evaluation index follows a normal distribution according to the average and the variance at the time. For example, a tree-structured Parzen estimator or the like is common.

In addition, the Bayesian search unit 12A may search for the search space information 38 using a learning type search method such as reinforcement learning and evolutionary learning.

In the present embodiment, a case where the Bayesian search unit 12A searches for the search space information 38 by the Bayesian search will be described as an example. Incidentally, the search method of the Bayesian search unit 12A is not limited to the Bayesian search.

The Bayesian search unit 12A outputs a searched model structure 27A'. The first learned model structure 27A' is obtained by selecting any of the plurality of pieces of search space information 38 for each of the convolution processing blocks 26B of the base model structure 26 to the evaluation unit 12C by the Bayesian search.

The evaluation unit 12C defines a target value of the evaluation index according to the target constraint condition 30 included in the model design information 22, and evaluates the searched model structure 27A'. For example, the evaluation unit 12C evaluates the searched model structure 27A' using an evaluation function. The evaluation function is expressed by, for example, the following Formula (A).

$$\text{Evaluation Function: } \max(P) \text{ subject to } S < T \text{ Function} \quad (A)$$

In Formula (A), P represents an evaluation index (for example, a recognition rate). In Formula (A), T indicates the currently set target constraint condition 30, and S indicates an actual value (constraint value) of an index set in the target constraint condition 30 as the currently evaluated search candidate.

For example, the evaluation unit 12C selects one or a plurality of items included in the target constraint condition 30 as a constraint value item. For example, the evaluation unit 12C defines, as the constraint value item, an item that contributes to operational constraints the most when the neural network model 33 is operated with target hardware. Then, the evaluation unit 12C sets a target value of the defined item as the target value "T" of the constraint value.

Specifically, for example, it is assumed that the evaluation unit 12C defines the model calculation amount as the item of the evaluation index. In this case, the evaluation unit 12C sets "500TFLOPS" in the target constraint condition 30 in FIG. 4 as the target value "T" of the evaluation index.

Then, the evaluation unit 12C evaluates the searched model structure 27A' using the target constraint condition 30 and the evaluation function represented by the above Formula (A), and calculates evaluation information 40. The evaluation information 40 is information indicating an evaluation result, and is sometimes referred to as evaluation cost or cost. The evaluation information 40 corresponds to a solution of the evaluation index "P" in Formula (A). In detail, for example, the evaluation unit 12C uses the searched model structure 27A' and the above Formula (A) in which the target value is set in accordance with the target constraint condition 30 to compare evaluation information of a candidate searched in the past and evaluation information obtained with a current search candidate, and selects one having the larger evaluation index the evaluation information 40.

The evaluation unit 12C evaluates the evaluation information 40 (evaluation index "P") as described above, and outputs the information to the Bayesian search unit 12A.

The Bayesian search unit 12A to which the evaluation information 40 is input from the evaluation unit 12C executes a search process of selecting the search space information 38 for the base model structure 26 again. The Bayesian search unit 12A outputs a new searched model structure 27A' thus searched to the evaluation unit 12C.

Then, the Bayesian search unit 12A and the evaluation unit 12C repeat a series of processes until it is determined that the number of repetitions of the series of processes performed by the Bayesian search unit 12A and the evaluation unit 12C has exceeded a specified number of times. The specified number of times may be determined in advance.

When determining that the number of repetitions of the series of processes performed by the Bayesian search unit 12A and the evaluation unit 12C has exceeded the specified number, the evaluation unit 12C outputs the searched model structure 27A', which is less than the target value "T" of the constraint value and has the highest evaluation index "P", to the parameter search unit 14 as the first learned model structure 27A.

That is, the structure search unit 12 outputs the searched model structure 27A' satisfying the above Formula (A) to the parameter search unit 14 as the first learned model structure 27A.

Figure 7:
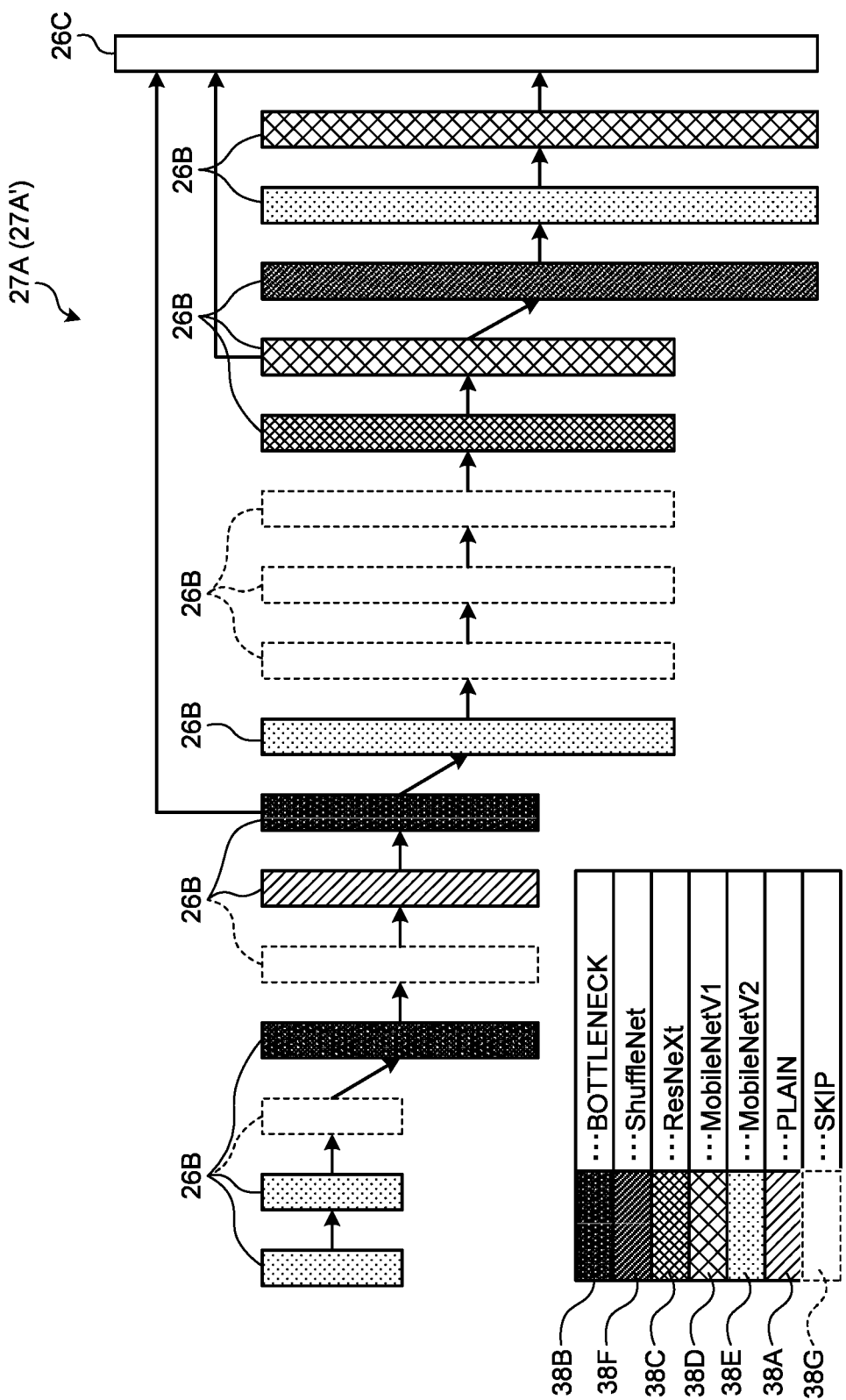
FIG. 7 is a schematic diagram of a first learned model structure.

FIG. 7 is a schematic diagram illustrating an example of the first learned model structure 27A. The first learned model structure 27A is obtained by selecting the search space information 38 for each of the convolution processing blocks 26B of the base model structure 26 (see FIG. 3).

In general, the search space information 38 (the Bottleneck structure 38B to the Skip structure 38G) other than the Plain structure 38A among the plurality of pieces of search space information 38 illustrated in FIG. 6 has a smaller calculation amount than the Plain structure 38A. Thus, the first learned model structure 27A output from the structure search unit 12 has the calculation amount which is the same as that of the base model structure 26 or smaller than that of the base model structure 26.

Incidentally, the calculation amount also depends on the structure of ResNet-N. As such, when ResNet-50 or the like having the structure of the Bottleneck structure 38B as the initial structure is used as the base model structure 26, there is no guarantee that the calculation amount of the first learned model structure 27A is necessarily smaller than that of the base model structure 26. On the other hand, ResNet-34 and ResNet-50 having the Bottleneck structure 38B are designed to have almost the same calculation amount.

The structure search unit 12 may determine an internal parameter in the search space information 38 in advance such that a difference in the target constraint condition 30 is likely to occur among the plurality of pieces of search space information 38. For example, the structure search unit 12 may perform processing such as setting the number of channels in an intermediate layer of the Bottleneck structure 38B to 1/N in advance (N is a numeral that is larger than one).

Returning to FIG. 1, the description will be continued. Next, the parameter search unit 14 will be described. The parameter search unit 14 updates the learning parameter 28 of the neural network model 32 in accordance with the target constraint condition 30.

When receiving the first learned model structure 27A, the parameter search unit 14 searches for a suitable learning parameter based on the target constraint condition 30 from a learning parameter group used for learning of the first learned model structure 27A. Then, the parameter search unit 14 sets the searched learning parameter as a searched learning parameter 29 that is a learning parameter after the search. Then, the parameter search unit 14 outputs the first learned model structure 27A and the searched learning parameter 29 to the pruning unit 16.

Figure 8:
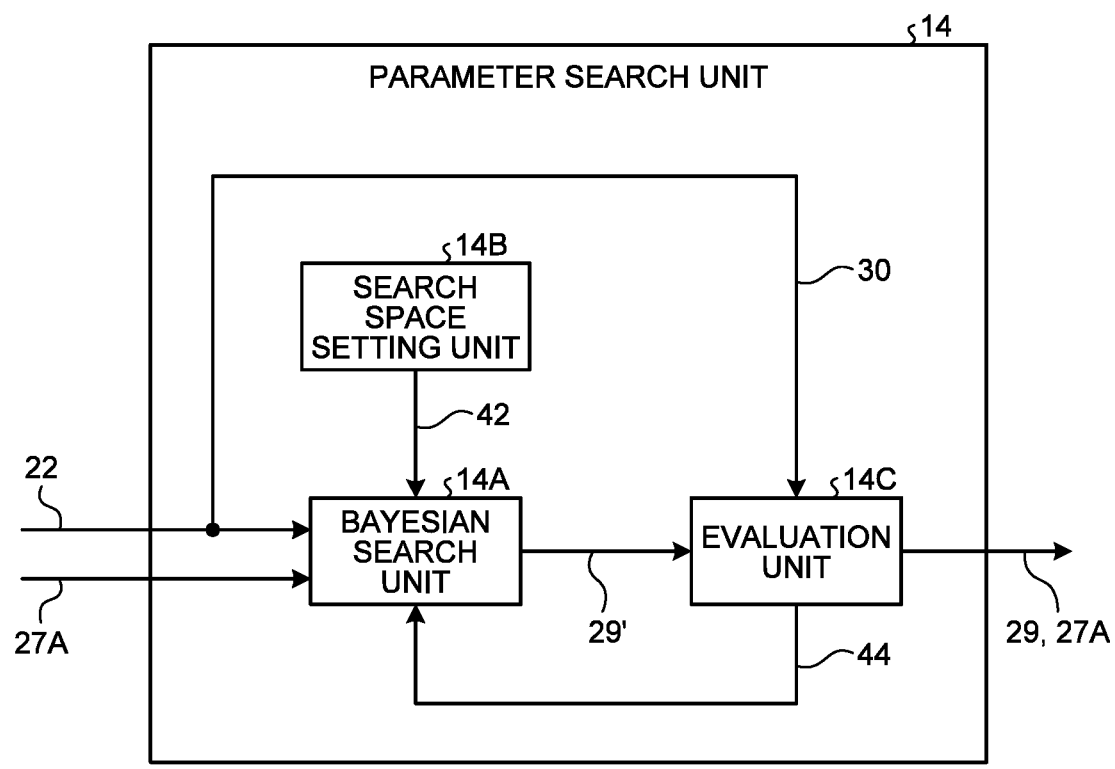
FIG. 8 is a functional block diagram of a parameter search unit.

FIG. 8 is a functional block diagram illustrating an example of a functional configuration of the parameter search unit 14. The parameter search unit 14 includes a Bayesian search unit 14A, a search space setting unit 14B, and an evaluation unit 14C.

When the first learned model structure 27A is input to the parameter search unit 14, the search space setting unit 14B outputs search space information 42 including a group of parameters different from each other to the Bayesian search unit 14A.

FIG. 9 is an explanatory diagram illustrating an example of the search space information 42. The search space information 42 is information indicating a search space of one or more parameters (hyperparameters). FIG. 9 illustrates an example in which the search space information 42 is information indicating a plurality of search ranges respectively for a plurality of hyperparameters.

The search space information 42 is information in which a hyperparameter generally used for machine learning, such as an optimization technique, a learning rate, an L2 regularization strength, an L1 regularization strength, an activation function, a dropout rate, a unit count of a layer, and a kernel size of a unit, is associated with each search range of each hyperparameter.

The optimization technique is a hyperparameter at the time of updating a weight coefficient, and for example, a search range, such as a stochastic gradient descent and adaptive moment estimation (Adam) which are generally used, can be selected. The learning rate is a hyperparameter indicating how much a weight coefficient is to be updated in one learning period. Weight decay is one of regularization functions introduced to a loss function, and is a hyperparameter configured to adjust the regularization strength using L2 regularization that does not make the weight coefficient too large.

Returning to FIG. 8, the description will be continued. The Bayesian search unit 14A searches for a searched parameter 29' in accordance with the search space information 42 input from the search space setting unit 14B. That is, the Bayesian search unit 14A selects any one in the corresponding search range for each hyperparameter included in the search space information 42 (see FIG. 9).

Here, it is assumed that a hyperparameter having a combination of Adam as the optimization technique, ReLU as the activation function of the base model, and L2 regularization as the regularization function is selected as the searched parameter 29'. In this case, the neural network model 33 after learning by the learning device 10 is subjected to group sparsifying. Thus, it is preferable that the Bayesian search unit 14A search for the search space information 42 including the hyperparameter of the combination of Adam as the optimization technique, ReLU as the activation function of the base model, and L2 regularization as the regularization function. Then, the Bayesian search unit 14A obtains the searched parameter 29' by searching a value range of a strength parameter for the L2 regularization. This enables the first learned model structure 27A after learning to be more compact in the pruning unit 16 as described later.

The Bayesian search unit 14A may search the search space information 42 using a known method such as random search, grid search, and Bayesian search similarly to the Bayesian search unit 12A.

The Bayesian search unit 14A outputs the searched parameter 29' to the evaluation unit 14C.

The evaluation unit 14C defines a target value of a constraint value according to the target constraint condition 30 included in the model design information 22, and evaluates the searched parameter 29'. For example, the evaluation unit 14C evaluates the searched parameter 29' using the above evaluation function (A).

For example, the evaluation unit 14C selects one or a plurality of items included in the target constraint condition 30 as a constraint value item. For example, the evaluation unit 14C defines, as the constraint value item, an item that contributes to operational constraints the most when the neural network model 33 is operated with target hardware. Then, the evaluation unit 14C sets a target value of the defined item as the target value "T" of the constraint value.

Specifically, for example, it is assumed that the evaluation unit 14C defines the model calculation amount as the item of the evaluation index. In this case, the evaluation unit 14C defines "500TFLOPS" in the target constraint condition 30 in FIG. 4 as the target value "T" of the constraint value.

Incidentally, the evaluation unit 14C may define the same items as the evaluation unit 12C or may define different items.

Then, the evaluation unit 14C evaluates the searched parameter 29' using the target constraint condition 30 and the evaluation function illustrated in the above Formula (A), and calculates evaluation information 44. The evaluation information 44 is information indicating an evaluation result, and is sometimes referred to as evaluation cost or cost. The evaluation information 44 corresponds to a solution of the evaluation index "P" in Formula (A). In detail, for example, the evaluation unit 14C uses the searched parameter 29' and the above Formula (A) in which the target value is set in accordance with the target constraint condition 30 to compare evaluation information of a candidate searched in the past and evaluation information obtained with a current search candidate, and selects one having the larger evaluation index the evaluation information 44.

The evaluation unit 14C evaluates the evaluation information 40 (evaluation index "P") and outputs the information to the Bayesian search unit 14A.

The Bayesian search unit 14A to which the evaluation information 44 is input from the evaluation unit 14C executes a search process for the searched parameter 29' again. The Bayesian search unit 14A outputs the new searched parameter 29' thus searched to the evaluation unit 14C.

Then, the Bayesian search unit 14A and the evaluation unit 14C repeat a series of processes until it is determined that the number of repetitions of the series of processes performed by the Bayesian search unit 14A and the evaluation unit 14C has exceeded a specified number of times. The specified number of times may be determined in advance.

When determining that the number of repetitions of the series of processes performed by the Bayesian search unit 14A and the evaluation unit 14C has exceeded the specified number, the evaluation unit 14C outputs the searched parameter 29', which is less than the target value "T" of the constraint value and has the highest evaluation index "P", to the parameter search unit 14 as the searched learning parameter 29.

FIG. 10 is a schematic diagram illustrating an example of the searched learning parameter 29. As illustrated in FIG. 10, the searched learning parameter 29 is in a state where a value after the search is defined for each hyperparameter. In this manner, the parameter search unit 14 searches for the searched learning parameter 29.

Returning to FIG. 8, the description will be continued. Incidentally, the functions of the Bayesian search unit 14A, the search space setting unit 14B, and the evaluation unit 14C included in the parameter search unit 14 are the same as the functions of the Bayesian search unit 12A, the search space setting unit 12B, and the evaluation unit 12C included in the structure search unit 12 (see FIG. 5).

As such, the learning device 10 may use at least some of these functions of the structure search unit 12 and the parameter search unit 14 as a common module. Specifically, for example, the Bayesian search unit 12A and the Bayesian search unit 14A may be used as a common module, the search space setting unit 12B and the search space setting unit 14B may be used as a common module, and the evaluation unit 12C and the evaluation unit 14C may be used as a common module. When the corresponding functions of the structure search unit 12 and the parameter search unit 14 are used as the common module in this manner, it is possible to eliminate redundancy between modules, for example, at the time of executing the structure search unit 12 and the parameter search unit 14 in a program. In addition, when the structure search unit 12 and the parameter search unit 14 are configured as hardware in this case, the circuit is downsizeable.

Incidentally, a mode in which the structure search unit 12 and the parameter search unit 14 perform evaluation using the evaluation function represented by the above Formula (A) is illustrated as an example in the above description. However, the structure search unit 12 and the parameter search unit 14 may perform evaluation using different evaluation functions.

In addition, at least one of the structure search unit 12 and the parameter search unit 14 may perform evaluation using an evaluation function different from the above Formula (A).

For example, a case is assumed where an evaluation environment that simulates target hardware for operating the neural network model 33 can be used. In this case, in the learning device 10, the operation of the target hardware is simulated using the model structure at the time of the search (the base model structure 26 or the first learned model structure 27A) and the learning parameter (the learning data set 24 or the searched learning parameter 29). Through this process, the learning device 10 simulates values of the respective items indicated in the target constraint condition 30 such as the inference speed of the neural network model 33, the memory amount at the time of execution, the power consumption at the time of execution, and the memory bandwidth. Then, the structure search unit 12 and the parameter search unit 14 may perform evaluation using an evaluation function in which these simulated values are equal to or less than target values corresponding to the respective items of the target constraint condition 30.

In addition, for example, the structure search unit 12 and the parameter search unit 14 may perform cost evaluation using values of the plurality of items indicated in the target constraint condition 30. In this case, the structure search unit 12 and the parameter search unit 14 preferably use, for example, a weighted sum of target values of constraint values corresponding to the respective items to set an evaluation function in an axis of an item of each constraint value (item of the target constraint condition 30). Incidentally, this example is illustrative, and the structure search unit 12 and the parameter search unit 14 may set a complicated evaluation function that optimizes axes of a plurality of constraint value items.

In addition, the search space setting unit 14B may set a constraint condition of a search space more strictly than the search space setting unit 12B. For example, sparse search may be performed in the search space setting unit 12B, which is a higher-order module that executes processing before the search space setting unit 14B, and the search space setting unit 14B, which is a lower-order module that executes processing after the search space setting unit 12B, may search a narrower search space. In this case, the search space setting unit 14B, which is the lower-order module, can search the search space with strict constraint conditions such that recognition performance is improved after performing the sparse search in the search space setting unit 12B, which is the higher-order module, to roughly estimate a space of a good quality solution. Thus, in this case, the learning device 10 can search for a suitable solution under a plurality of constraint conditions.

Incidentally, at the time of each search of the first learned model structure 27A and the searched learning parameter 29 performed by the structure search unit 12 and the parameter search unit 14, the search is performed at a high speed by combining at least one reduction process of data size reduction to contract a size of an input image or a teacher label included in the learning data set 24 vertically and horizontally, reduction of the data padding, and reduction of the number of learning iterations. In general, the repeated relearning of the neural network model 33 requires a large calculation amount, and thus, simplification, such as contraction of the size of the input image, contraction of the padding method, and reduction of the number of times of learning, is effective.

Returning to FIG. 1, the description will be continued. Next, the pruning unit 16 will be described.

The pruning unit 16 receives the searched learning parameter 29 and the first learned model structure 27A from the parameter search unit 14. In addition, the pruning unit 16 acquires the model design information 22 from the storage unit 20.

When receiving the searched learning parameter 29 and the first learned model structure 27A from the parameter search unit 14, the pruning unit 16 deletes a unit of at least one of the plurality of convolution processing blocks 26B in the first learned model structure 27A based on the target constraint condition 30 and generates a second learned model structure 27B.

In detail, the pruning unit 16 deletes a loosely coupled unit included in the first learned model structure 27A using determination information set from the learning parameter 28 or the searched learning parameter 29 and generates the second learned model structure 27B. The loosely coupled unit means a unit that hardly contributes to an output at the time of inference in the neural network model 33 in the first learned model structure 27A. More specifically, when a weight coefficient norm is almost zero (for example, $1 \times 10^{-15}$ or smaller), an output value input to such a node and subjected to a convolution process also becomes almost zero. Such a node is called an inactive node and does not contribute to subsequent calculations.

Figure 11:
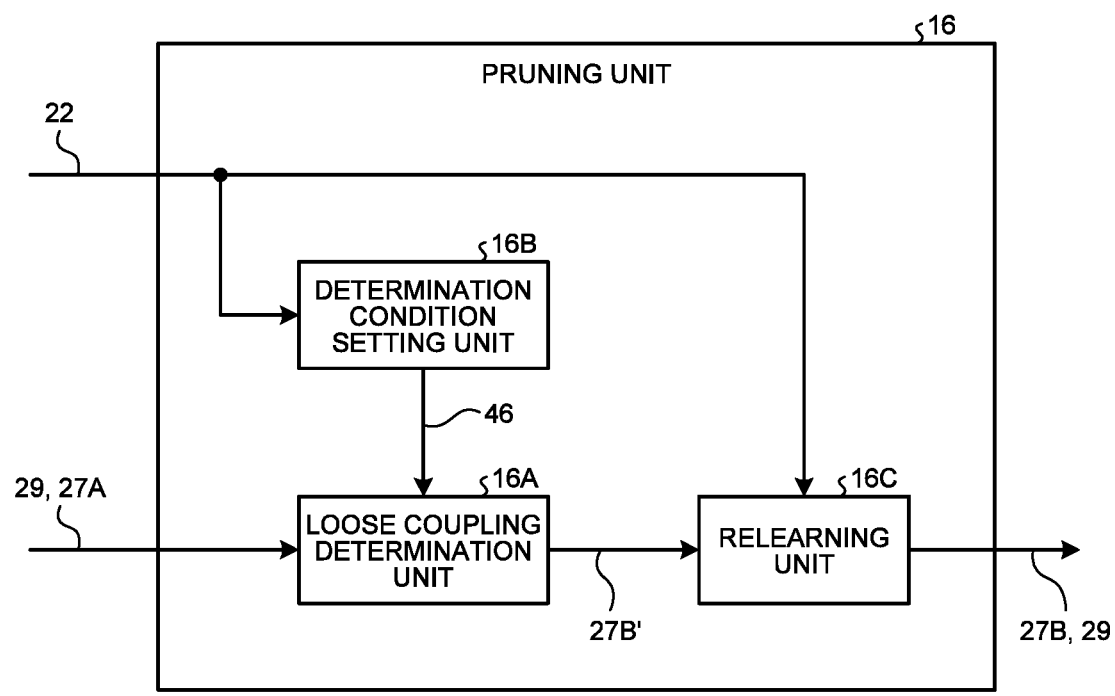
FIG. 11 is a functional block diagram of a pruning unit.

FIG. 11 is a functional block diagram illustrating an example of a functional configuration of the pruning unit 16.

The pruning unit 16 includes a loose coupling determination unit 16A, a determination condition setting unit 16B, and a relearning unit 16C.

When the first learned model structure 27A and the searched learning parameter 29 are input to the pruning unit 16, the determination condition setting unit 16B sets determination information 46 configured to determine whether a unit holding the weight coefficient is loosely coupled based on the learning parameter 28 included in the model design information 22. The determination information 46 is a threshold of a weight coefficient norm that is a determination condition for loose coupling.

Specifically, the determination condition setting unit 16B is a threshold of a weight coefficient norm included in the learning parameter 28, and sets a value such as $1 \times 10^{-15}$ as the determination information 46, for example. Incidentally, the determination condition setting unit 16B may set the determination information 46 using the searched learning parameter 29 instead of the learning parameter 28.

The determination condition setting unit 16B outputs the set determination information 46 to the loose coupling determination unit 16A.

The loose coupling determination unit 16A calculates a weight coefficient norm of each unit of each of the plurality of convolution processing blocks 26B included in the first learned model structure 27A based on the first learned model structure 27A. When the calculated norm is smaller than the determination information 46, the loose coupling determination unit 16A determines that the unit of the norm is loosely coupled. Then, the loose coupling determination unit 16A deletes the unit determined to be loosely coupled among all the units included in the first learned model structure 27A from the first learned model structure 27A. This unit deletion is sometimes referred to as pruning.

The loose coupling determination unit 16A outputs the first learned model structure 27A after the deletion of the loosely coupled unit to the relearning unit 16C as a searched model structure 27B'.

The relearning unit 16C relearns the searched model structure 27B' using the searched learning parameter 29. Then, the relearning unit 16C outputs the second learned model structure 27B, which is the searched model structure 27B' after the relearning, and the searched learning parameter 29 to the morphing unit 18.

Incidentally, the threshold that is the determination information 46 is an extremely small value such as $1 \times 10^{-15}$ Thus, the unit which is determined to be loosely coupled is determined using this determination information 46 and deleted does not affect the second learned model structure 27B finally output from the pruning unit 16, and thus, relearning is unnecessary. Thus, the pruning unit 16 may be configured so as not to include the relearning unit 16C.

In this case, the loose coupling determination unit 16A may output the searched model structure 27B' to the morphing unit 18 as the second learned model structure 27B.

Incidentally, there is a case where a large value that affects the second learned model structure 27B is set as a threshold that is the determination information 46. Thus, a mode in which the pruning unit 16 includes the relearning unit 16C will be described as an example in the present embodiment.

Incidentally, the second learned model structure 27B relearned by the relearning unit 16C may be output to the loose coupling determination unit 16A in the pruning unit 16. Then, a loosely coupled unit may be deleted using the determination information 46 from the second learned model structure 27B received from the relearning unit 16C in the loose coupling determination unit 16A, and the resultant may be output to the relearning unit 16C again as the searched model structure 27B'. In this case, the relearning unit 16C preferably outputs the second learned model structure 27B obtained by the relearning to the morphing unit 18 when determining that a series of processes of the loose coupling determination unit 16A and the relearning unit 16C are repeatedly executed a predetermined specified number of times.

Figure 12:
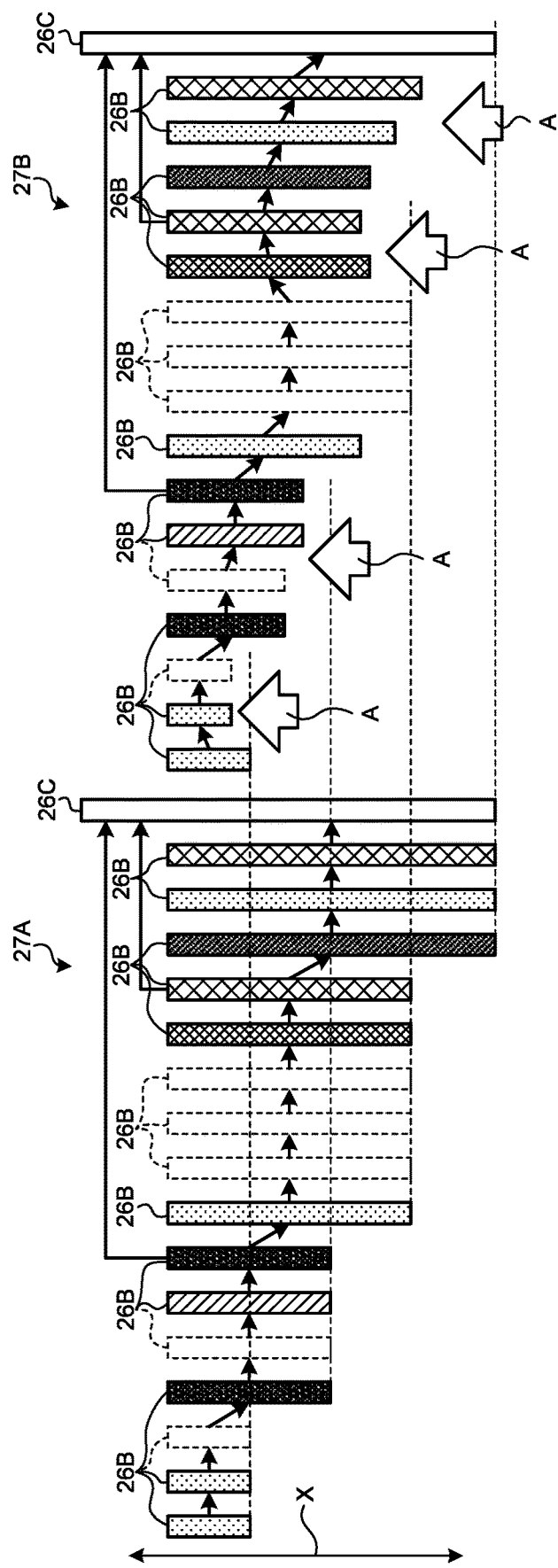
FIG. 12 is a schematic diagram of a first learned model structure and a second learned model structure.

FIG. 12 is a schematic diagram illustrating examples of the first learned model structure 27A and the second learned model structure 27B. When the unit is deleted by the pruning unit 16, the number of units of at least some convolution processing blocks 26B among the plurality of convolution processing blocks 26B included in the second learned model structure 27B decreases. Thus, a width (length in the arrow X direction) of the convolution processing block 26B with the reduced unit count is reduced (see the convolution processing block 26B indicated by the arrow A).

Since the pruning unit 16 deletes the loosely coupled unit from the first learned model structure 27A, an unnecessary unit can be suitably deleted while maintaining the performance of the second learned model structure 27B.

Returning to FIG. 1, the description will be continued. Next, the morphing unit 18 will be described.

The morphing unit 18 expands or contracts the second learned model structure 27B in accordance with the target constraint condition 30. It is preferable that the morphing unit 18 expand or contract the convolution processing block 26B included in the second learned model structure 27B in the state of maintaining a ratio of the unit count among the plurality of convolution processing blocks 26B included in the second learned model structure 27B.

Figure 13:
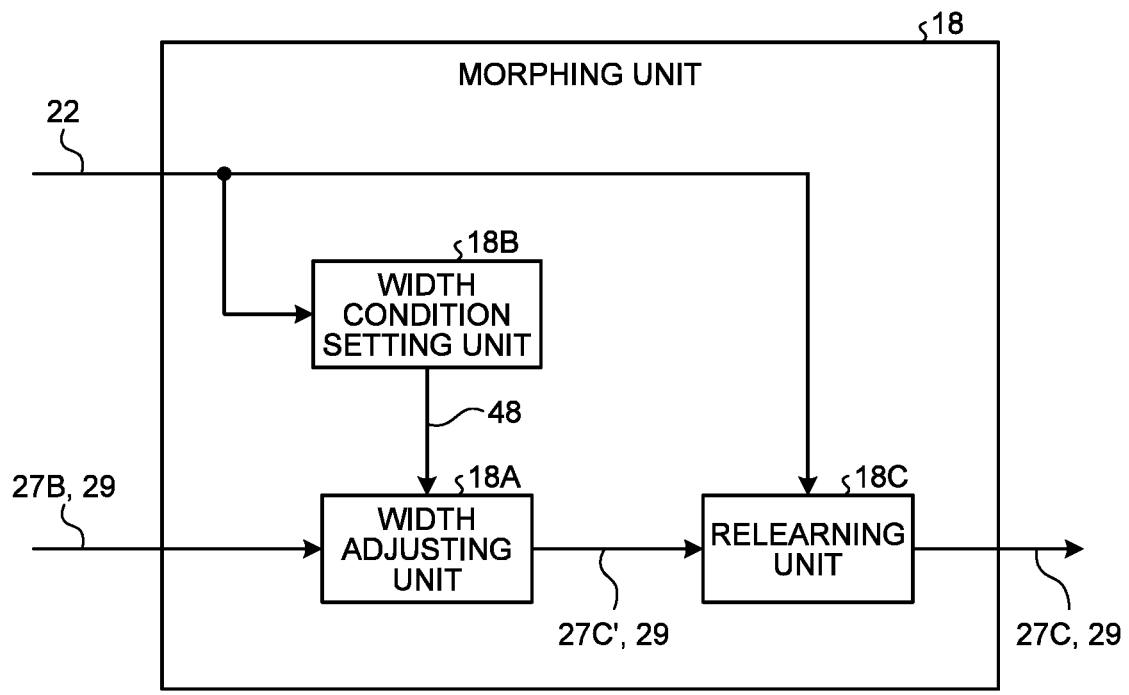
FIG. 13 is a functional block diagram of a morphing unit.

FIG. 13 is a functional block diagram illustrating an example of a functional configuration of the morphing unit 18. The morphing unit 18 includes a width adjusting unit 18A, a width condition setting unit 18B, and a relearning unit 18C.

When receiving the second learned model structure 27B and the searched learning parameter 29 from the pruning unit 16, the morphing unit 18 calculates a target value of each item of the target constraint condition 30 (see FIG. 4) from the second learned model structure 27B and calculates a difference from the target value of each item defined in the target constraint condition 30 included in the model design information 22. Then, the morphing unit 18 generates a third learned model structure 27C by expanding or contracting the second learned model structure 27B using the calculated difference.

In detail, when the second learned model structure 27B and the searched learning parameter 29 are input to the morphing unit 18, the width condition setting unit 18B acquires the target constraint condition 30 and the base model structure 26 from the model design information 22. Then, the width condition setting unit 18B sets width information 48 that defines a maximum size of a width of the convolution processing block 26B of the base model structure 26, which is required to strictly follow the acquired target constraint condition 30.

The width condition setting unit 18B sets the width information 48 by calculating the width information 48 using the target constraint condition 30.

It is possible to calculate target values of a model size and a calculation amount of a model, which are the items defined in the target constraint condition 30, if the width of the convolution processing block 26B, that is, the unit count of each of the convolution processing blocks 26B is determined. Thus, the width condition setting unit 18B can calculate the width information 48 using the target constraint condition 30 and the base model structure 26. Incidentally, the items included in the target constraint condition 30 include an item that is not calculated unless simulated on target hardware corresponding to the target constraint condition 30. In this case, the width condition setting unit 18B preferably simulates an upper limit of a value at the time of operating the neural network model 32 of the base model structure 26 on the target hardware based on the width of each of the convolution processing blocks 26B included in the base model structure 26 and use the simulated value for calculation of the width information 48.

The width condition setting unit 18B outputs the set width information 48 to the width adjusting unit 18A.

The width adjusting unit 18A expands or contracts the second learned model structure 27B in accordance with the width information 48. The width adjusting unit 18A expands or contracts the second learned model structure 27B in the state of maintaining a ratio of the unit count among the plurality of convolution processing blocks 26B included in the second learned model structure 27B.

In detail, the width adjusting unit 18A calculates each value of the model size and the calculation amount of the model, which are the items defined in the target constraint condition 30, in the case of operating the neural network model 33 of the second learned model structure 27B on the target hardware. Then, the width adjusting unit 18A calculates a difference between a target value calculated from the base model structure 26 in the width condition setting unit 18B and a value calculated from the second learned model structure 27B in the width adjusting unit 18A for each of the items defined in the target constraint condition 30.

Then, the width adjusting unit 18A expands or contracts the second learned model structure 27B such that this difference is as close to zero as possible. At this time, the width adjusting unit 18A expands or contracts the convolution processing block 26B in the state of maintaining the ratio of the unit count among the plurality of convolution processing blocks 26B included in the second learned model structure 27B as described above. At this time, the width adjusting unit 18A expands or contracts the convolution processing block 26B such that the width of the convolution processing block 26B is equal to or smaller than the width information 48 received from the width condition setting unit 18B.

The width adjusting unit 18A outputs an adjusted model structure 27C', obtained by expanding or contracting the second learned model structure 27B, to the relearning unit 18C.

The relearning unit 18C relearns the adjusted model structure 27C' using the searched learning parameter 29. Then, the relearning unit 18C stores the third learned model structure 27C, which is the adjusted model structure 27C' after the relearning, and the searched learning parameter 29 in the storage unit 20.

Thus, the base model structure 26 and the learning parameter 28 constituting the neural network model 32 of the storage unit 20 are updated to the third learned model structure 27C and the searched learning parameter 29. That is, the neural network model 32 stored in the storage unit 20 is optimized in accordance with the target constraint condition 30 and is designed (relearned) to the neural network model 33 in the third learned model structure 27C and the searched learning parameter 29 by the learning device 10.

Incidentally, the relearning unit 18C may determine whether the third learned model structure 27C after the relearning satisfies the target constraint condition 30, and store the third learned model structure 27C and the learning parameter 28 in the storage unit 20 when determining that the target constraint condition 30 is satisfied. When the relearning unit 18C determines that the target constraint condition 30 is not satisfied, the relearning unit 18C may output the third learned model structure 27C to the width adjusting unit 18A.

In this case, the relearning unit 18C preferably performs width adjustment in the above-described manner on the third learned model structure 27C received from the relearning unit 18C. In this case, the relearning unit 18C preferably stores the third learned model structure 27C in the storage unit 20 when determining that the series of processes of the loose coupling determination unit 16A and the relearning unit 16C are repeatedly executed the predetermined specified number of times or when determining that the relearned third learned model structure 27C satisfies the target constraint condition 30.

For example, it is possible to consider a case where an optimal solution is also changed by changing an axis priority when multi-axis optimization is performed. In addition, a learning result generally varies from the viewpoint of random numbers and floating-point operation in deep learning. Thus, it is possible to improve the performance of the third learned model structure 27C by repeating a series of processes of the width adjusting unit 18A and the relearning unit 18C.

Figure 14:
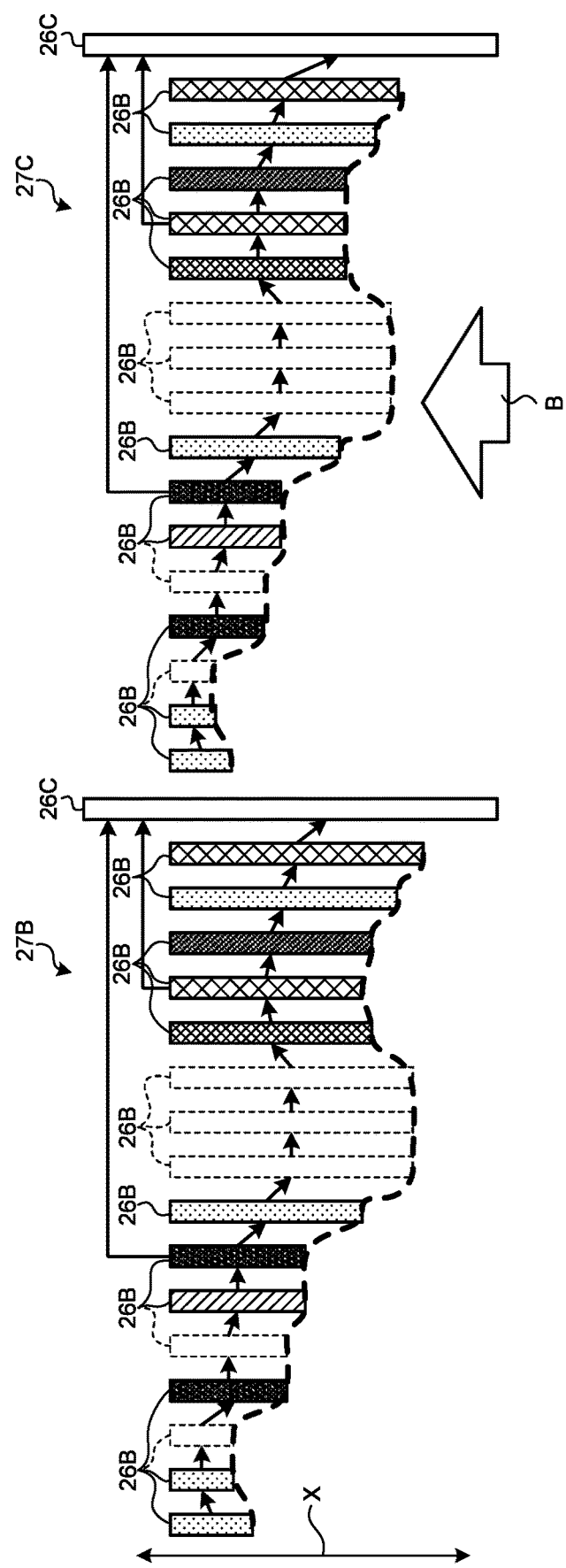
FIG. 14 is a schematic diagram of a second learned model structure and a third learned model structure.

FIG. 14 is a schematic diagram illustrating examples of the second learned model structure 27B and the third learned model structure 27C.

FIG. 14 illustrates an example of the third learned model structure 27C obtained by contracting the second learned model structure 27B.

As illustrated in FIG. 14, the third learned model structure 27C after being processed by the width condition setting unit 18B has a structure in which the width (length in the X direction, that is, the unit count) of the convolution processing block 26B is adjusted as compared to the second learned model structure 27B before being processed by the morphing unit 18. Specifically, the third learned model structure 27C is a contracted structure (see an arrow B) while maintaining the ratio of the unit count, that is, the width ratio among the plurality of convolution processing blocks 26B in the second learned model structure 27B. In addition, the unit count in each of the plurality of convolution processing blocks 26B included in the third learned model structure 27C is reduced so as to be equal to or smaller than the target constraint condition 30. That is, the unit count is reduced in the third learned model structure 27C such that the difference between the target value of each item indicated in the target constraint condition 30 and the value of each item in the case of operating the neural network model 33 of the third learned model structure 27C on the target hardware becomes zero.

On the other hand, when the morphing unit 18 generates the third learned model structure 27C obtained by expanding the second learned model structure 27B, the third learned model structure 27C is a structure expanded in the state of maintaining the ratio of the unit count among the plurality of convolution processing blocks 26B included in the second learned model structure 27B.

Incidentally, the unit deleted (pruned) by the pruning unit 16 is the unit determined to be unnecessary from among all the units of the base model structure 26. Thus, the second learned model structure 27B output from the pruning unit 16 is a structure in which the width ratio among the convolution processing blocks 26B is optimized. Thus, the morphing unit 18 may use the third learned model structure 27C obtained by enlarging the second learned model structure 27B when there is a margin in the specifications of the target hardware, and use the third learned model structure 27C obtained by contracting the second learned model structure 27B when there is no margin.

In this case, the morphing unit 18 can execute a morphing process in consideration of the performance of the target hardware. In detail, when the third learned model structure 27C obtained by enlarging the second learned model structure 27B is used, the width of each of the plurality of convolution processing blocks 26B is evenly expanded since the width ratio among the plurality of convolution processing blocks 26B included in the second learned model structure 27B is optimized. Thus, in this case, it is possible to improve the performance while maintaining the generality of the target hardware by operating the neural network model 33 of the third learned model structure 27C on the target hardware.

In addition, when the third learned model structure 27C obtained by contracting the second learned model structure 27B is used, the morphing unit 18 can contract the neural network model 33 of the third learned model structure 27C to the minimum of the specifications of the target hardware while maintaining the generality such that the specific convolution processing block 26B does not become a bottleneck.

Next, an example of a flow of a learning process executed by the learning device 10 of the present embodiment will be described.

Figure 15:
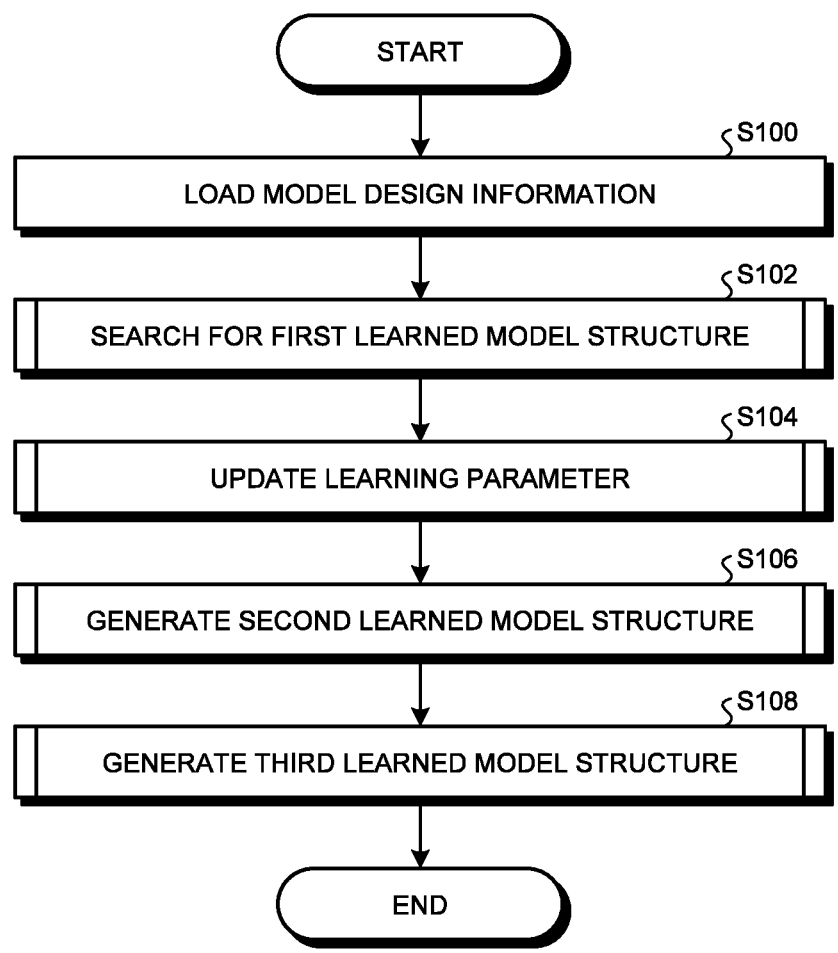
FIG. 15 is a flowchart illustrating a flow of a learning process.

FIG. 15 is a flowchart illustrating an example of the flow of the learning process executed by the learning device 10.

First, the structure search unit 12 loads the model design information 22 from the storage unit 20 (Step S100).

The structure search unit 12 searches for the first learned model structure 27A. The first learned model structure 27A is obtained by selecting the search space information in accordance with the target constraint condition 30 of the target hardware for each of the plurality of convolution processing blocks 26B of the base model structure 26 included in the model design information 22 (Step S102).

Next, the parameter search unit 14 searches the parameter optimal for the first learned model structure 27A using the first learned model structure 27A and the model design information 22 and outputs the searched learning parameter 29 (Step S104).

Next, the pruning unit 16 executes prunes the loosely coupled unit included in the first learned model structure 27A using the model design information 22 to generate the second learned model structure 27B (Step S106).

Next, the morphing unit 18 generates the third learned model structure 27C, obtained by expanding or contracting the second learned model structure 27B using the model design information 22, and stores the searched learning parameter 29 and the third learned model structure 27C in the storage unit (Step S108). Then, this routine is ended.

The searched learning parameter 29 and the neural network model 33 in the third learned model structure 27C are used as the neural network model 33 learned in accordance with the target hardware.

Next, each process of Step S102 to Step S108 will be described in detail.

Figure 16:
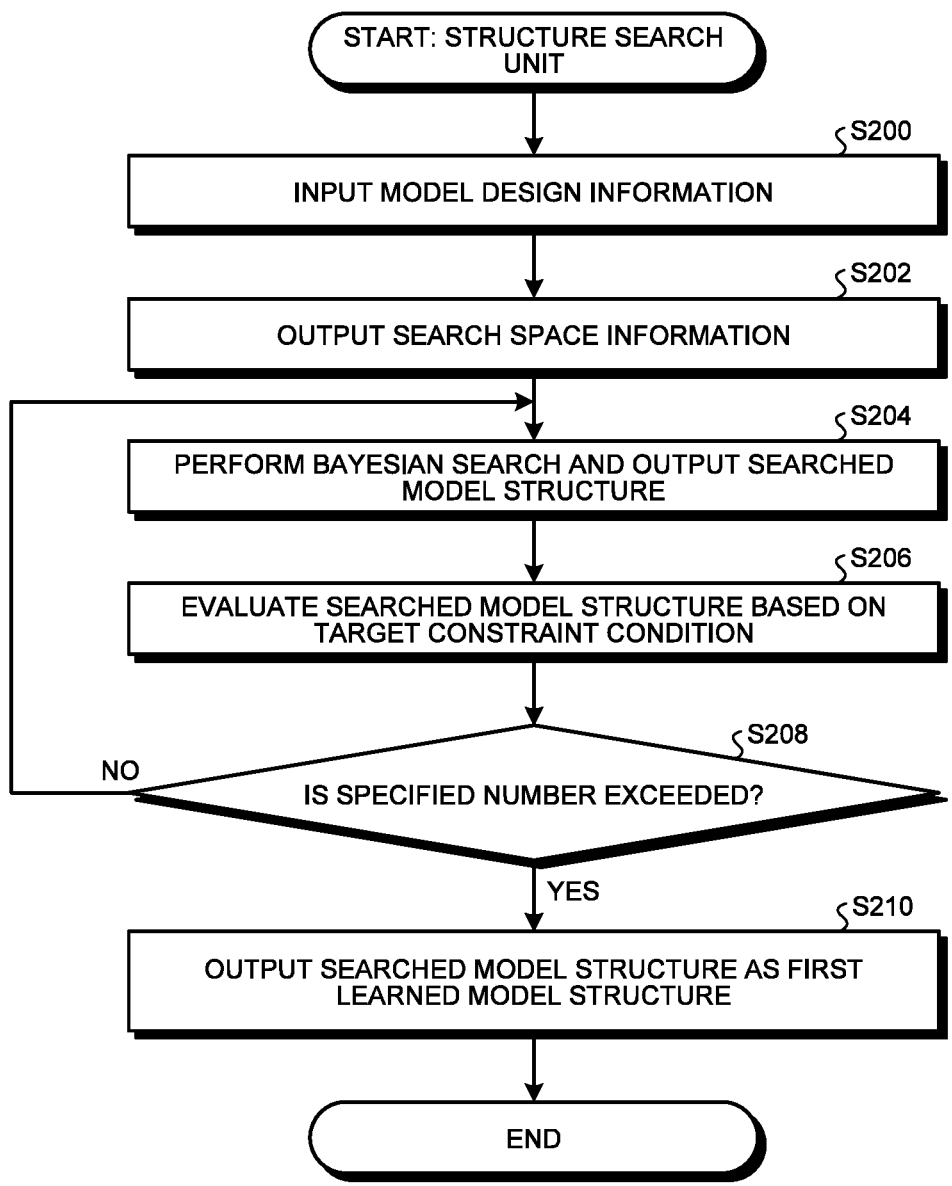
FIG. 16 is a flowchart illustrating a flow of a search process executed by the structure search unit.

FIG. 16 is a flowchart illustrating an example of a flow of the search process executed by the structure search unit 12. That is, FIG. 16 is a flowchart illustrating a detailed flow of the process of Step S102 of FIG. 15 described above.

When the model design information 22 is input to the structure search unit 12 (Step S200), the search space setting unit 12B outputs the plurality of pieces of search space information 38 of different calculation methods to the Bayesian search unit 12A (Step S202).

The Bayesian search unit 12A performs a Bayesian search according to the plurality of pieces of search space information 38 input from the search space setting unit 12B in Step S202 to search for the search space information 38 selected for each of the plurality of convolution processing blocks 26B constituting the base model structure 26 included in the model design information 22. Then, the Bayesian search unit 12A outputs the searched model structure 27A' generated by the Bayesian search to the evaluation unit 12C (Step S204).

The evaluation unit 12C evaluates the searched model structure 27A' received from the Bayesian search unit 12A in Step S204 based on the target constraint condition 30 included in the model design information 22 (Step S206).

Then, the evaluation unit 12C determines whether the number of times of the series of processes performed in Step S204 and Step S206 exceeds the specified number (Step S208).

When a negative determination is made in Step S208 (Step S208: No), the processing returns to the above-described Step S204. On the other hand, when an affirmative determination is made in Step S208 (Step S208: Yes), the processing proceeds to Step S210.

In Step S210, the evaluation unit 12C outputs the searched model structure 27A', which is less than the target value "T" of the constraint value and has the highest evaluation index "P", among the searched model structures 27A' obtained by the processes in Steps S204 to S208 to the parameter search unit 14 as the first learned model structure 27A (Step S210). Then, this routine is ended.

Figure 17:
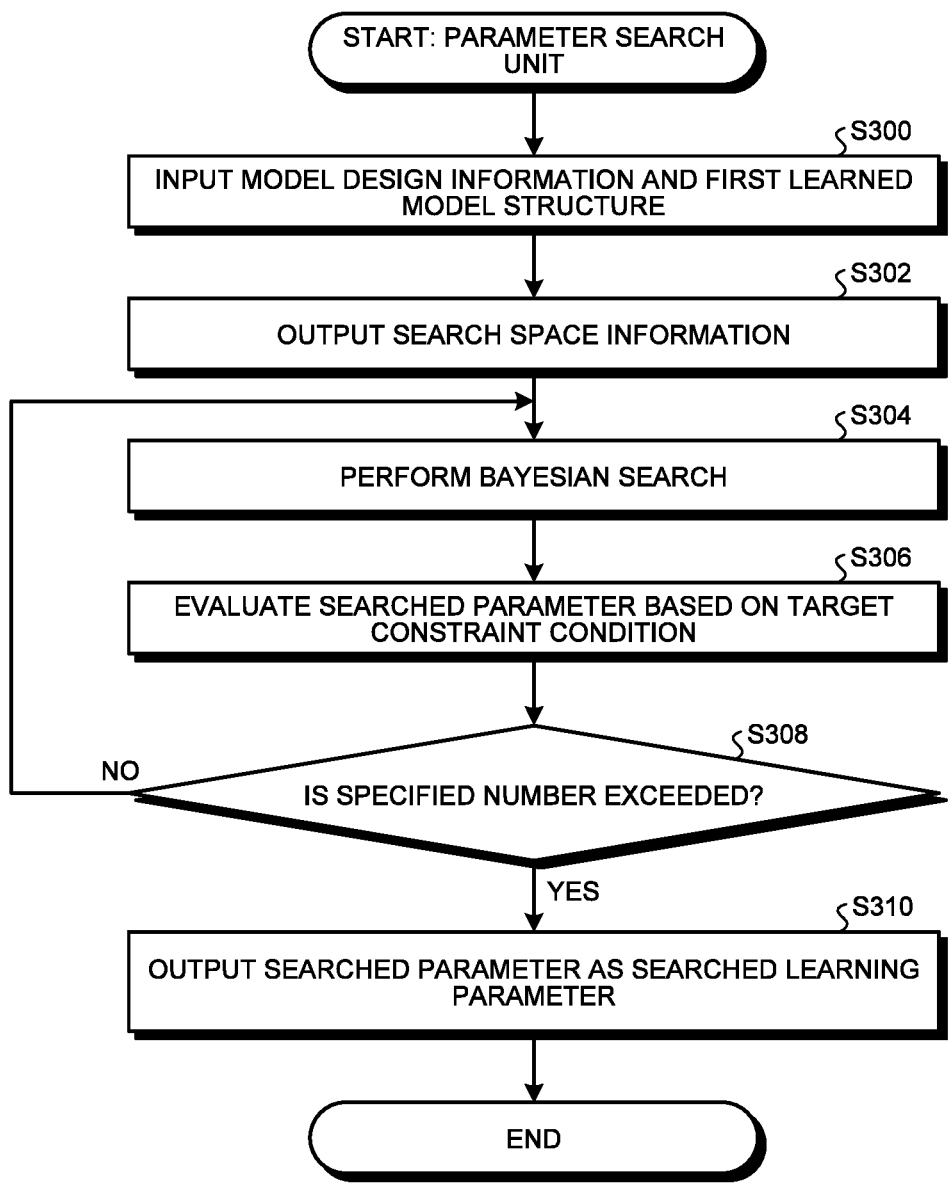
FIG. 17 is a flowchart illustrating a flow of a search process executed by the parameter search unit.

FIG. 17 is a flowchart illustrating an example of a flow of the search process executed by the parameter search unit 14. That is, FIG. 17 is a flowchart illustrating a detailed flow of the process in Step S104 of FIG. 15 described above.

When the first learned model structure 27A is input to the parameter search unit 14 (Step S300), the search space setting unit 14B outputs search space information 42 including a group of parameters different from each other to the Bayesian search unit 14A (Step S302).

The Bayesian search unit 14A searches for a searched parameter 29' in accordance with the search space information 42 input from the search space setting unit 14B in Step S302 (Step S304).

The evaluation unit 14C evaluates the searched parameter 29' searched in Step S302 based on the target constraint condition 30 included in the model design information 22 (Step S306).

The evaluation unit 14C determines whether the number of times of the series of processes performed from Step S304 to Step S306 exceeds the specified number (Step S308).

When a negative determination is made in Step S308 (Step S308: No), the processing returns to the above-described Step S304. On the other hand, when an affirmative determination is made in Step S308 (Step S308: Yes), the processing proceeds to Step S310.

In Step S310, the evaluation unit 14C outputs the searched parameter 29', which is less than the target value "T" of the constraint value and has the highest evaluation index "P", among the searched parameters obtained by the processes in Steps S304 to S308 to the parameter search unit 14 as the searched learning parameter 29 (Step S310). Then, this routine is ended.

Figure 18:
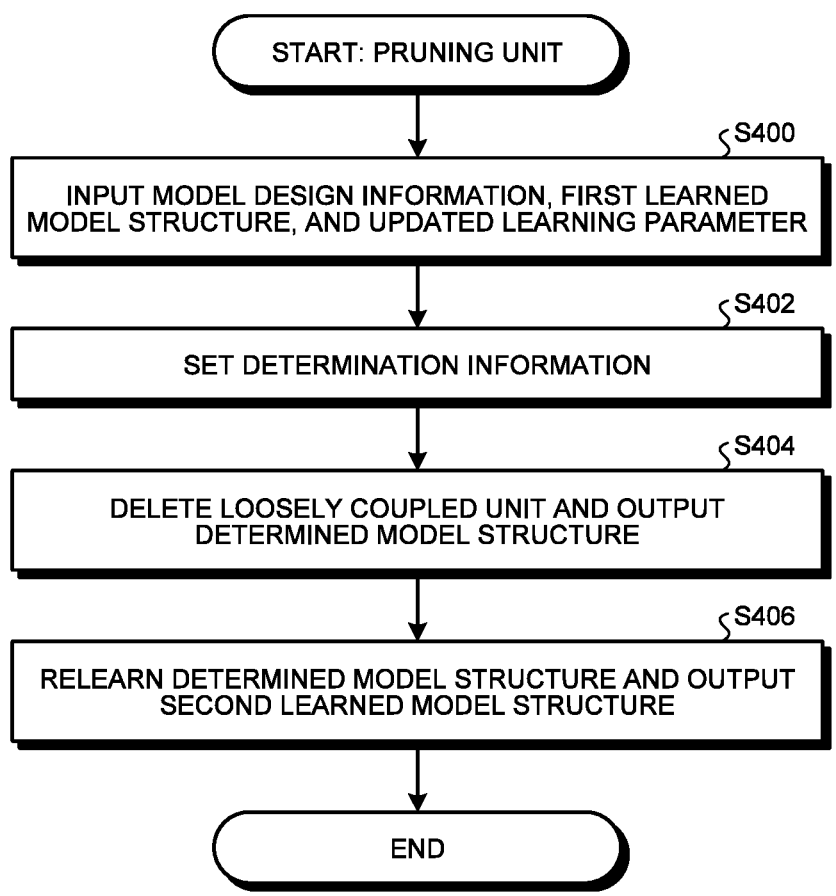
FIG. 18 is a flowchart illustrating a pruning process executed by the pruning unit.

FIG. 18 is a flowchart illustrating an example of a flow of the pruning process executed by the pruning unit 16. That is, FIG. 18 is a flowchart illustrating a detailed flow of the process of Step S106 in FIG. 15 described above.

When the first learned model structure 27A and the searched learning parameter 29 are input to the pruning unit 16 (Step S400), the determination condition setting unit 16B sets the determination information 46 from the learning parameter 28 included in the model design information 22 (Step S402).

The loose coupling determination unit 16A determines a loosely coupled unit included in the first learned model structure 27A using the determination information 46, and deletes the loosely coupled unit. Then, the loose coupling determination unit 16A outputs the first learned model structure 27A after the deletion of the loosely coupled unit to the relearning unit 16C as the searched model structure 27B' (Step S404).

The relearning unit 16C relearns the searched model structure 27B' using the searched learning parameter 29. Then, the relearning unit 16C outputs the second learned model structure 27B, which is the searched model structure 27B' after the relearning, and the searched learning parameter 29 to the morphing unit 18 (Step S406). Then, this routine is ended.

Figure 19:
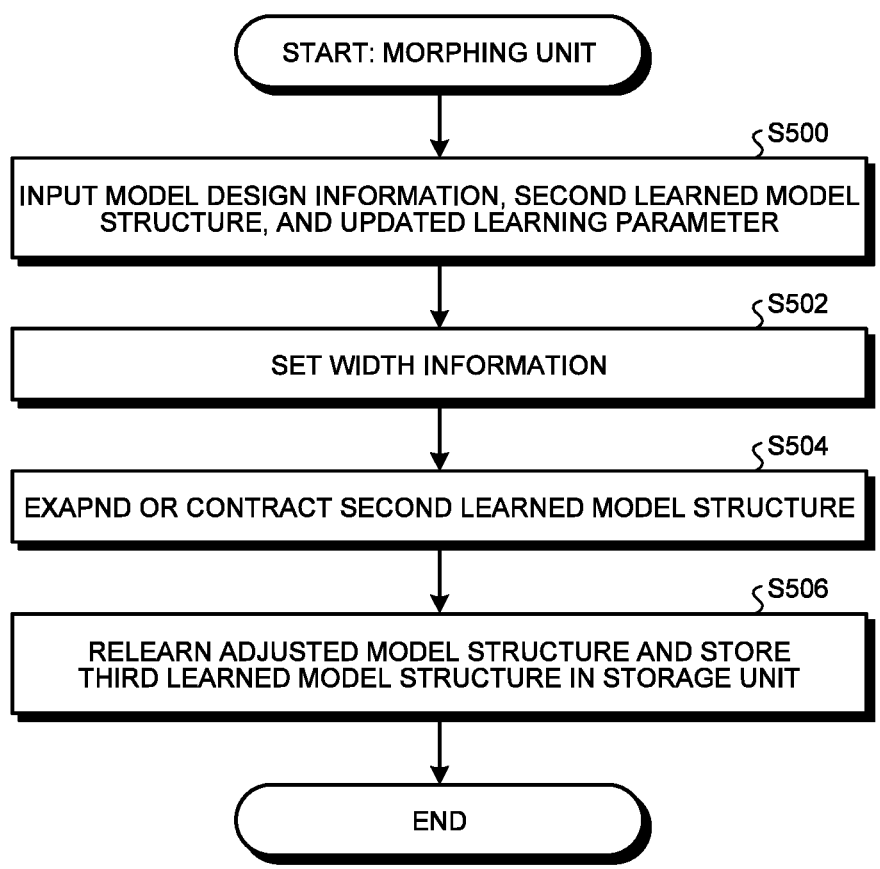
FIG. 19 is a flowchart illustrating a flow of a morphing process executed by the morphing unit.

FIG. 19 is a flowchart illustrating an example of a flow of the morphing process executed by the morphing unit 18. That is, FIG. 19 is a flowchart illustrating a detailed flow of the process of Step S108 in FIG. 15 described above.

When the second learned model structure 27B and the searched learning parameter 29 are input from the pruning unit 16 to the morphing unit 18 (Step S500), the width condition setting unit 18B sets the width information 48 using the target constraint condition 30 (Step S502).

The width adjusting unit 18A expands or contracts the second learned model structure 27B in accordance with the width information 48 set in Step S502 (Step S504).

The relearning unit 18C relearns the adjusted model structure 27C' using the searched learning parameter 29. Then, the relearning unit 18C stores the third learned model structure 27C, which is the adjusted model structure 27C' after the relearning, and the searched learning parameter 29 in the storage unit 20 (Step S506). Then, this routine is ended.

As described above, the learning device 10 of the present embodiment includes the structure search unit 12. The structure search unit 12 searches for the first learned model structure 27A. The first learned model structure 27A is obtained by selecting the search space information 38 in accordance with the target constraint condition 30 of the target hardware for each of the plurality of convolution processing blocks 26B included in the base model structure 26 in the neural network model 32.

Thus, the learning device 10 of the present embodiment searches for the first learned model structure 27A in accordance with the target constraint condition 30.

Thus, it is possible to design the neural network model 33 suitable for the target hardware by using the neural network model 33 in the first learned model structure 27A as the neural network model 33 for the operation on the target hardware.

Therefore, the learning device 10 of the present embodiment can design the neural network model 33 suitable for the target hardware.

In addition, in the learning device 10 of the present embodiment, the parameter search unit 14 searches the learning parameter 28 of the neural network model 32 in accordance with the target constraint condition 30 after the structure search unit 12 searches the first learned model structure 27A. In addition, in the learning device 10 of the present embodiment, the pruning unit 16 deletes the unit of at least one of the plurality of convolution processing blocks 26B of the first learned model structure 27A based on the target constraint condition 30, and generates the second learned model structure 27B after the parameter search unit 14 searches the searched learning parameter 29. Then, the morphing unit 18 generates the third learned model structure 27C by expanding or contracting the second learned model structure 27B output from the pruning unit 16.

In this manner, the neural network model 33 is designed (learned) by performing optimization in order from a high-order structure to a low-order structure of the neural network model 32 in the learning device 10 according to the present embodiment. The high-order structure indicates architecture of the neural network model 32 itself. A medium-order structure indicates the learning parameter 28. The low-order structure is a structure that learns a weight coefficient after determining the high-order to the middle-order hyperparameters such as the architecture and learning parameter 28.

In the present embodiment, the structure search unit 12 processes the high-order structure, and the parameter search unit 14, the pruning unit 16, and the morphing unit 18 process the medium-order structure. Incidentally, functional units that perform learning or relearning of the neural network model 33 are the Bayesian search unit 12A, the Bayesian search unit 14A, the relearning unit 16C, and the relearning unit 18C. These functional units execute even the learning of the weight coefficient which is the low-order structure.

That is, in the learning device 10 of the present embodiment, the optimization processing is performed in order from the high-order structure to the medium-order structure, and finally the low-order structure is optimized. Thus, the learning device 10 of the present embodiment can design (relearn), for example, the large-scale neural network model 32 with the highest performance, which is not bound by the constraint such as the model size and the calculation amount, to the compact neural network model 33 that operates under the constraint of the target hardware such as an edge device. In addition, the learning device 10 of the present embodiment can design the neural network model 33 in which the performance degradation of the target hardware is suppressed while maintaining the generality of the neural network model 32 before design during the design (relearning) and which is compressed to the model size suitable for the specifications of the target hardware.

Incidentally, the example in which the processing from the structure search unit 12 to the morphing unit 18 via the parameter search unit 14 and the pruning unit 16 is sequentially processed as a cascade process is described in the present embodiment. However, a process of a specific function unit among the structure search unit 12, the parameter search unit 14, the pruning unit 16, and the morphing unit 18 may be skipped.

For example, a case is assumed where a model for which architecture (model structure) is adjusted in advance for target hardware is prepared as the neural network model 32 and the neural network model 33 is designed from the neural network model 32. In this case, the learning device 10 may skip the process of the structure search unit 12, and the parameter search unit 14, the pruning unit 16, and the morphing unit 18 may execute the above processes.

In addition, for example, there is a case where it is difficult to use conditions to generate the group sparsifying, which uses Adam as the optimization technique and uses any condition between ReLU and L2 regularization as the activation function. In this case, the learning device 10 may execute the process of the morphing unit 18 without the pruning unit 16 after setting an appropriate learning parameter range for the parameter search unit 14.

In addition, as another combination of conditions to cause the group sparsifying, loose coupling can be generated by introducing L1 regularization into loss functions of regularization processing included in the convolution processing blocks 26B and searching for these regularization strengths with the parameter search unit 14.

In addition, a regularization term (regularization using a group lasso) or the like that causes the group sparsifying may be introduced in advance into a loss function configured to obtain the base model structure 26.

(Modifications)

The Bayesian search unit 12A and the Bayesian search unit 14A included in the structure search unit 12 and the parameter search unit 14 described in the above embodiment may have a general neural network learning function.

For example, the Bayesian search unit 12A performs learning using an initially set convolution structure, and performs evaluation of an evaluation function using performance and a model size after learning. The Bayesian search unit 12A may repeat an approach of searching for a next search candidate according to the evaluation result here.

In addition, for example, the Bayesian search unit 14A performs learning using an initially set learning parameter, and performs evaluation of an evaluation function using performance and a model size after learning. The Bayesian search unit 14A may repeat an approach of searching for a next search candidate according to the evaluation result here.

In this case, the functions that repeat these approaches may be configured as a common module, and the module may be used in common by the Bayesian search unit 12A and the Bayesian search unit 14A.

In addition, the relearning unit 16C and the relearning unit 18C included in the pruning unit 16 and the morphing unit 18 have the same function. Thus, the same function of the both may be configured as a common module, and the module may be used in common by the relearning unit 16C and the relearning unit 18C.

In addition, the description is given assuming that the relearning unit 16C and the relearning unit 18C included in the pruning unit 16 and the morphing unit 18 have the functions of relearning the first learned model structure 27A and the second learned model structure 27B, which are the learned base model structures 26, respectively, in the above embodiment. The relearning unit 16C and the relearning unit 18C may use distillation learning as an approach for such relearning. The distillation learning is not learning with a general teaching label (referred to as a hard target) but a technique for learning a student model so as to reproduce an output value (referred to as a soft target) in the case of inferring input data with respect to an original teacher model. When the distillation learning is used, the neural network model 33, which is the student model, can be learned without significantly impairing the inference performance of the large-scale neural network model 32.

Incidentally, the description is given assuming that the learning device 10 sets (relearns) the neural network model 33 by relearning (fine-tuning) the neural network model 32 in the above embodiment. However, scratch learning may be performed instead of the relearning. In this case, the learning device 10 retains the learning parameter and the convolution structure as they are, but initializes the weight coefficient with a random number and learns the neural network model 32 again from the beginning. In general, it is reported that the performance of some models improves with scratch learning rather than fine-tuning (relearning) of the neural network model 32 which is a learned model. In addition, the learning device 10 may perform relearning by calculating a norm of a weight matrix after learning a weight matrix given first several times and loading a weight initial value given first while leaving only those whose norm threshold is larger than a predefined value. In deep learning, weight initial values given first and the unit arrangement of the weights are important, and there is a case where the performance is greatly improved by resetting and relearning the weight initial values that are determined to be important as a result of learning to some extent.

(Hardware Configuration)

Figure 20:
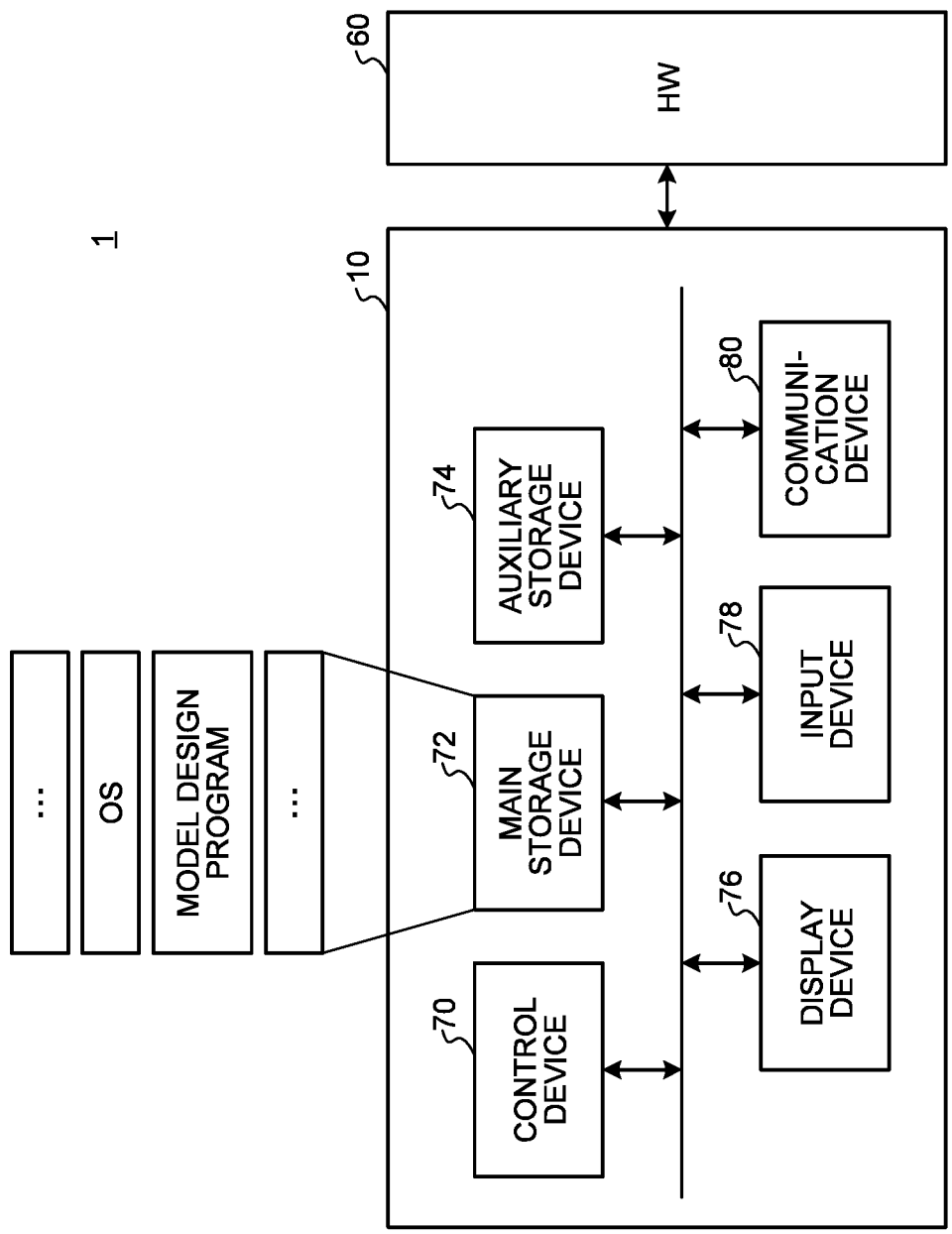
FIG. 20 is a schematic diagram illustrating a hardware configuration.

FIG. 20 is a diagram illustrating an example of a hardware configuration of a learning system 1 including the learning device 10 according to the embodiment and the modifications. The learning system 1 according to the present embodiment is implemented by, for example, the hardware configuration as illustrated in FIG. 15.

The learning system 1 includes the learning device 10 and target hardware (HW) 60. The target hardware 60 is hardware on which the neural network model 33 learned by the learning device 10 is to be operated. The learning device 10 and the target hardware 60 are connected directly or via another mechanism (for example, a storage medium) so as to be capable of receiving and transmitting data. Incidentally, it may be configured such that the learning device 10 is provided in the target hardware 60.

The learning device 10 includes a control device 70, a main storage device 72, an auxiliary storage device 74, a display device 76, an input device 78, and a communication device 80. The control device 70, the main storage device 72, the auxiliary storage device 74, the display device 76, the input device 78, and the communication device 80 are connected via a bus.

The control device 70 is, for example, a central processing unit (CPU). The control device 70 executes a program read from the auxiliary storage device 74 to the main storage device 72. The main storage device 72 is a memory such as a read only memory (ROM) and a random access memory (RAM). In general, the main storage device 72 is implemented using a DRAM or the like. The auxiliary storage device 74 is a hard disk drive (HDD), a solid state drive (SSD), a memory card, or the like.

The display device 76 displays display information. The display device 76 is, for example, a graphic processing unit (CPU). Here, the display device 76 may be connected to a liquid crystal display or the like functioning as an external display. The input device 78 is an input interface configured to operate the learning device 10. The input device 78 is, for example, a keyboard, a mouse, or the like. When the learning device 10 is a smart device such as a smartphone and a tablet terminal, the display device 76 and the input device 78 are, for example, touch panels. The communication device 80 is an interface configured for communication with other devices.

The program to be executed by the learning device 10 according to the above embodiment and modifications is recorded, as a file in an installable format or an executable format, in a computer-readable storage medium, such as a CD-ROM, a memory card, a CD-R, and a digital versatile disc (DVD), and provided as a computer program product.

In addition, it may be configured such that the program executed by the learning device 10 according to the above embodiment and modifications is stored in a computer connected to the network such as the Internet and is provided through download via the network. In addition, the program to be executed by the learning device 10 of the above embodiment and modifications may be provided via a network such as the Internet without being downloaded.

In addition, the program of the learning device 10 according to the above embodiment and modifications may be provided by being incorporated in a ROM or the like in advance.

The program to be executed by the learning device 10 of the above embodiment and modifications has a module configuration including functional blocks that can be also implemented by the program among the functional blocks described above. As the actual hardware, the respective functional blocks are loaded onto the main storage device 72 as the control device 70, which serves as actual hardware, reads and executes the program from the storage medium. That is, the above-described respective functional blocks are generated on the main storage device 72.

Incidentally, some or all of the above-described respective functional blocks may be implemented by hardware such as an IC instead of being implemented by software. In addition, when each function is implemented using a plurality of processors, each of the processors may implement one of the respective functions or two or more of the functions.

In addition, an operation mode of the learning device 10 according to the above embodiment and the modifications may be arbitrary. A learning device 10 according to the above embodiment and the modifications may be operated as a cloud system on a network, for example.

While certain embodiments are described, these embodiments are presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning device comprising:
   one or more hardware processors configured to perform:
   searching, by a structure search unit, for a first learned model structure, the first learned model structure being obtained by selecting search space information in accordance with a target constraint condition of target hardware for each of a plurality of convolution processing blocks included in a base model structure in a neural network model;
   searching, by a parameter search unit, for a learning parameter of the neural network model in accordance with the target constraint condition; and
   deleting, by a pruning unit, a unit of at least one of the plurality of convolution processing blocks in the first learned model structure based on the target constraint condition and generating a second learned model structure, wherein
   the parameter search unit searches for the learning parameter in accordance with the target constraint condition after the structure search unit searches for the first learned model structure,
   the pruning unit generates the second learned model structure after the parameter search unit searches for the learning parameter, and
   the pruning unit deletes a loosely coupled unit that is a unit which hardly contributes to an output at a time of inference in the neural network model in a learned model structure and that is included in the first learned model structure using determination information that is set from the learning parameter to generate the second learned model structure.

2. The learning device according to claim 1, wherein the one or more hardware processors are configured to further perform:
   expanding or contracting, by a morphing unit, the second learned model structure in accordance with the target constraint condition.

3. The learning device according to claim 2, wherein the morphing unit expands or contracts the second learned model structure in a state where a ratio of the number of units between the plurality of convolution processing blocks included in the second learned model structure is maintained.

4. The learning device according to claim 1, wherein the structure search unit selects, for each of the convolution processing blocks, the search space information in accordance with the target constraint condition of the target hardware from among a plurality of pieces of the search space information of different calculation methods.

5. The learning device according to claim 1, wherein the parameter search unit searches a search space of the learning parameter including a combination of a hyperparameter expressed by adaptive moment estimation that is an optimization technique at a time of updating a weight coefficient, L2 regularization as a regularization technique, and ReLU as an activation function in accordance with the target constraint condition to search for the learning parameter.

6. The learning device according to claim 1, wherein the parameter search unit includes an L1 regularization technique, which is applied to normalization processing included in the convolution processing block, and searches a search space of the learning parameter including an L1 regularization strength in accordance with the target constraint condition to search for the learning parameter.

7. The learning device according to claim 1, wherein the target constraint condition is an index determined by a specification of the target hardware, and includes at least one of a size of the neural network model, a calculation amount of the neural network model, a latency when inferring the neural network model, power consumption when inferring the neural network model, a memory size of the neural network model, and a memory bandwidth of the neural network model.

8. A learning system comprising:
target hardware; and
a learning device, wherein
the learning device comprises one or more hardware processors configured to perform:
searching, by a structure search unit, for a first learned model structure, the first learned model structure being obtained by selecting search space information in accordance with a target constraint condition of the target hardware for each of a plurality of convolution processing blocks included in a base model structure in a neural network model;
searching, by a parameter search unit, for a learning parameter of the neural network model in accordance with the target constraint condition; and
deleting, by a pruning unit, a unit of at least one of the plurality of convolution processing blocks in the first learned model structure based on the target constraint condition and generating a second learned model structure,
the parameter search unit searches for the learning parameter in accordance with the target constraint condition after the structure search unit searches for the first learned model structure,
the pruning unit generates the second learned model structure after the parameter search unit searches for the learning parameter, and
the pruning unit deletes a loosely coupled unit that is a unit which hardly contributes to an output at a time of inference in the neural network model in a learned model structure and that is included in the first learned model structure using determination information that is set from the learning parameter to generate the second learned model structure.

9. A learning method implemented by a learning device comprising one or more hardware processors functioning as a structure search unit, a parameter search unit, and a pruning unit, the method comprising:
searching, by the structure search unit, for a first learned model structure, the first learned model structure being obtained by selecting search space information in accordance with a target constraint condition of target hardware for each of a plurality of convolution processing blocks included in a base model structure in a neural network model;
searching, by the parameter search unit, for a learning parameter of the neural network model in accordance with the target constraint condition; and
deleting, by the pruning unit, a unit of at least one of the plurality of convolution processing blocks in the first learned model structure based on the target constraint condition and generating a second learned model structure, wherein
searching by the parameter search unit is performed for the learning parameter in accordance with the target constraint condition after searching by the structure search unit is performed for the first learned model structure,
generating the second learned model structure is performed by the pruning unit after searching is performed by the parameter search unit for the learning parameter, and
deleting by the pruning unit is performed for a loosely coupled unit that is a unit which hardly contributes to an output at a time of inference in the neural network model in a learned model structure and that is included in the first learned model structure using determination information that is set from the learning parameter to generate the second learned model structure.

* * * * *